(12) United States Patent
Kim et al.

(10) Patent No.: US 12,026,353 B2
(45) Date of Patent: Jul. 2, 2024

(54) MOBILE TERMINAL AND METHOD FOR CONTROLLING SAME

(71) Applicant: LG ELECTRONICS INC., Seoul (KR)

(72) Inventors: Hyungjin Kim, Seoul (KR); Jinsool Lee, Seoul (KR); Heejin Jun, Seoul (KR); Wonkwang Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/025,345

(22) PCT Filed: Sep. 22, 2020

(86) PCT No.: PCT/KR2020/012783
§ 371 (c)(1),
(2) Date: Mar. 8, 2023

(87) PCT Pub. No.: WO2022/065530
PCT Pub. Date: Mar. 31, 2022

(65) Prior Publication Data
US 2023/0325050 A1    Oct. 12, 2023

(51) Int. Cl.
*G06F 3/0482* (2013.01)
*G06F 3/04845* (2022.01)
*G06F 3/0485* (2022.01)

(52) U.S. Cl.
CPC ........ *G06F 3/0482* (2013.01); *G06F 3/04845* (2013.01); *G06F 3/0485* (2013.01); *G06F 2203/04803* (2013.01)

(58) Field of Classification Search
CPC .. G06F 3/0482; G06F 3/04845; G06F 3/0485; G06F 2203/04803; G06F 3/04817;
(Continued)

(56) References Cited

U.S. PATENT DOCUMENTS

2015/0186009 A1    7/2015  Nishimura
2017/0017379 A1*   1/2017  Sun ................. G06F 3/0483
(Continued)

FOREIGN PATENT DOCUMENTS

KR    10-2014-0073371    6/2014
KR    10-2014-0136794    12/2014
(Continued)

OTHER PUBLICATIONS

PCT International Application No. PCT/KR2022/012783, Written Opinion of the International Searching Authority dated Jun. 16, 2021, 9 pages.

*Primary Examiner* — Andrey Belousov
(74) *Attorney, Agent, or Firm* — LEE, HONG, DEGERMAN, KANG & WAIMEY

(57)    ABSTRACT

The present invention relates to a mobile terminal and a method for controlling same. More specifically, the present invention provides a mobile terminal and a method for controlling same, the mobile terminal comprising: a body; an input unit for receiving a user input; a display coupled to the body such that a display region viewable on the front surface of the body can vary depending on switching between an extended display mode and a reduced display mode; and a control unit, wherein the control unit: receives a first signal for outputting a recently used application list while a first application is output on the display, the recently used application list including a first application layout icon; receives a second signal for selecting the first application layout icon; divides the region of the display on the basis of the first application layout icon, when the second signal is received; and outputs at least one application in the divided region of the display.

15 Claims, 27 Drawing Sheets

(58) Field of Classification Search
CPC .. G06F 3/0484; G06F 3/0488; G06F 3/04886; H04M 1/02; H04M 1/725; H04M 1/72469; H04M 1/0235; H04M 1/0268; H04M 1/72454; H04M 2201/38
See application file for complete search history.

(56) References Cited

U.S. PATENT DOCUMENTS

2018/0188910 A1* 7/2018 Ko ................... G06F 1/1616
2020/0348824 A1* 11/2020 Rogers .............. G06F 3/04817

FOREIGN PATENT DOCUMENTS

| KR | 10-2018-0080629 | 7/2018 |
| KR | 10-2059427 | 12/2019 |

* cited by examiner (a)

(b)

(a)

(b)

(a)

(b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2020/012783, filed on Sep. 22, 2020, the contents of which are incorporated by reference herein in its entirety.

TECHNICAL FIELD

The present disclosure relates to a mobile terminal and a method for controlling the same. More specifically, the present disclosure relates to a mobile terminal that divides a screen based on an application layout icon and a method for controlling the same.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Mobile terminals may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players.

Efforts are ongoing to support and increase the functionality of mobile terminals. Such efforts include software and hardware improvements, as well as changes and improvements in the structural components.

Recently, a flexible display that may be greatly deformed because of sufficient elasticity has been developed. A size of the display of the mobile terminal may be varied using the deformable nature of the flexible display.

In particular, a plurality of applications may be output simultaneously by dividing a region of the extended display. To this end, the user has to divide the display and individually output the applications in the divided regions of the display.

SUMMARY

Technical Problem

The present disclosure is to solve the above and other problems.

The present disclosure is to provide a mobile terminal that selects an application layout icon to divide a region of a display and output at least one application at the same time, and a method for controlling the same.

Technical Solutions

According an aspect of the present disclosure, provided is a mobile terminal including a body, an input unit for receiving an input of a user, a display coupled to the body such that a display region visible from a front surface of the body is variable as a mode of the display is switched between an enlarged display mode and a reduced display mode, and a controller, wherein the controller receives a first signal for outputting a recently used application list containing a first application layout icon in a state where a first application is being output on the display, receives a second signal for selecting the first application layout icon, divides the region of the display based on the first application layout icon upon receiving the second signal, and outputs at least one application in the divided regions of the display.

In one implementation, when the first application layout icon contains an icon corresponding to the first application, an icon corresponding to a second application, and an icon corresponding to a third application, the controller may respectively output the first application, the second application, and the third application in the divided regions of the display based on the first application layout icon.

In one implementation, the recently used application list may contain a second application layout icon, and the controller may change the second application layout icon to a third application layout icon in response to a third signal for selecting the second application layout icon, and divide the region of the display based on the changed third application layout icon in response to a fourth signal for selecting the third application layout icon.

In one implementation, the controller may output the recently used application list containing the third application layout icon in a state where at least the one application is output in the divided regions of the display based on the third application layout icon, change the third application layout icon to the second application layout icon in response to a fifth signal for changing the third application layout icon, and output the first application in a full screen on the display based on the changed second application layout icon in response to a sixth signal for selecting the second application layout icon.

In one implementation, the first application layout icon may be created based on a screen division history of the first application.

In one implementation, the controller may output a visual effect on the first application layout icon based on the screen division history of the first application.

In one implementation, the controller may divide the region of the display based on a fourth application layout icon created based on the screen division history of the first application when a seventh signal for selecting the visual effect is no longer applied after going beyond a threshold value, and output the fourth application layout icon as a preview when the seventh signal does not go beyond the threshold value.

In one implementation, the controller may output the first application on a pop-up window in response to the first signal, and output at least one application contained in the first application layout icon as a background screen of the pop-up window based on the first application layout icon.

In one implementation, the controller may divide the region of the display based on the first application layout icon and output the at least one application upon receiving an eighth signal for selecting the pop-up window and then dragging the pop-up window in a first direction.

In one implementation, the controller may output the first application as a background screen in response to the first signal, and output a fourth application on a pop-up window based on a screen division history of the first application.

In one implementation, the controller may output the fourth application on the display in a full screen in response to a ninth signal for selecting the fourth application output on the pop-up window.

In one implementation, the controller may output the first application and the fourth application in the divided regions of the display in response to a tenth signal for selecting the fourth application output on the pop-up window and dragging the fourth application to the background screen.

In one implementation, the controller may output a visual effect in a predetermined region of the first application when the first application has a screen division history, and divide the region of the display based on the screen division history to output the at least one application upon receiving an eleventh signal for selecting the visual effect.

In one implementation, the predetermined region may be determined based on the screen division history.

In one implementation, the recently used application list may contain a plurality of application layout icons, and the controller may align the plurality of application layout icons based on attributes.

According to another aspect of the present disclosure, a method for controlling a mobile terminal including a display coupled to a body such that a display region visible from a front surface of the body is variable as a mode of the display is switched between an enlarged display mode and a reduced display mode includes receiving a first signal for outputting a recently used application list in a state where the first application is being output, wherein the recently used application list contains a first application layout icon, receiving a second signal for selecting the first application layout icon, dividing a region of the display based on the first application layout icon upon receiving the second signal, and outputting at least one application in the divided regions of the display.

Advantageous Effects

Effects of the mobile terminal and the method for controlling the same according to the present disclosure will be described as follows.

According to at least one of the embodiments of the present disclosure, there is the advantage in that the applications may be output in the divided regions of the screen based on the screen division history of the application.

According to at least one of the embodiments of the present disclosure, there is the advantage in that the screen may be divided at once by selecting the application layout icon and the multiple applications may be output at the same time.

A further scope of applicability of the present disclosure will become apparent from the detailed description below.

However, because various changes and modifications within the spirit and scope of the present disclosure may be clearly understood by those skilled in the art, it should be understood that the detailed description and specific embodiments such as the preferred embodiment of the present disclosure are only given as examples.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
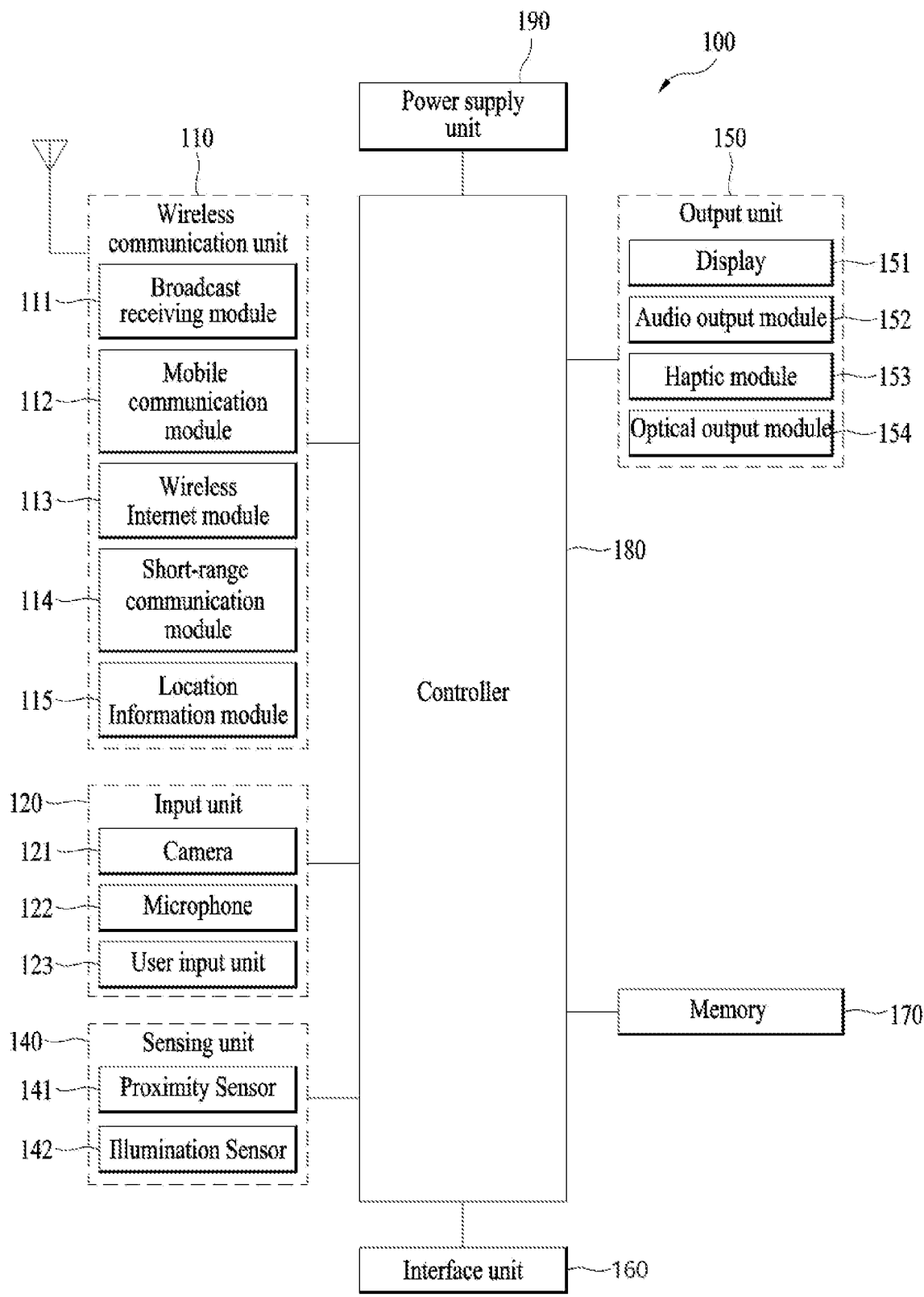
FIG. 1 is a block diagram for describing a mobile terminal.

FIG. 1 is a block diagram for describing a mobile terminal.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
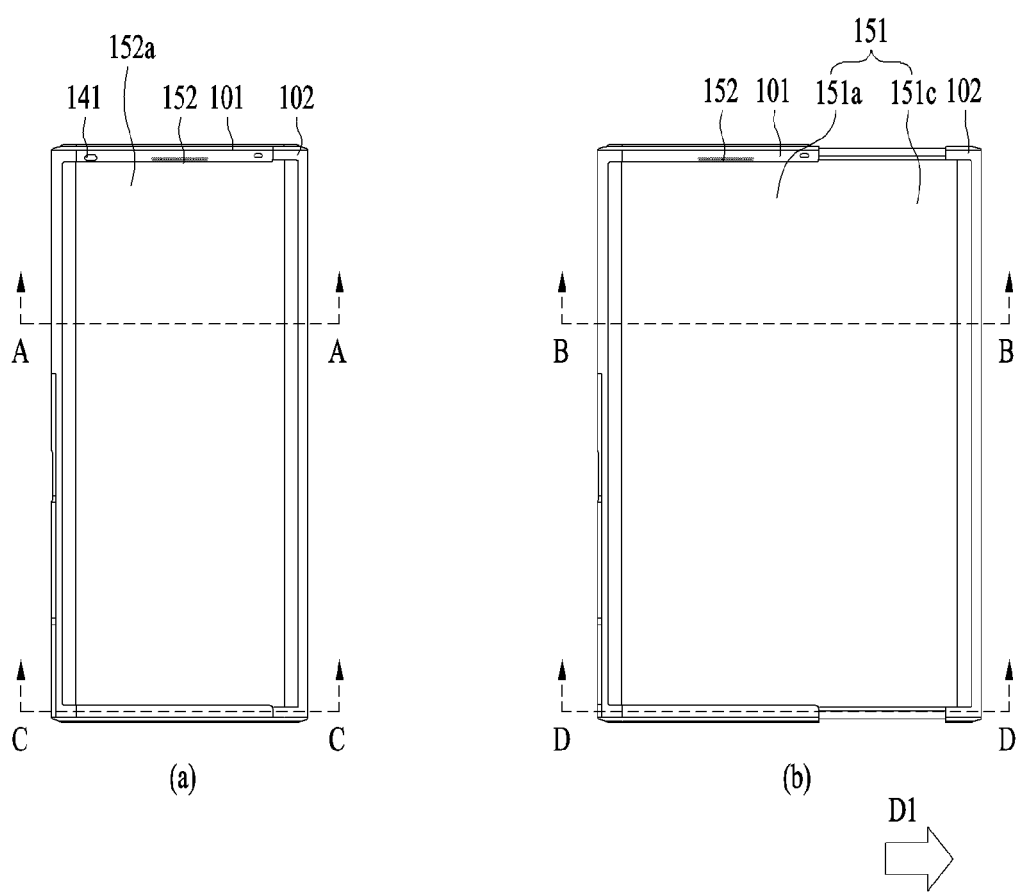
FIG. 2 is a front view of a first state and a second state of the mobile terminal in accordance with an embodiment.
Figure 3:
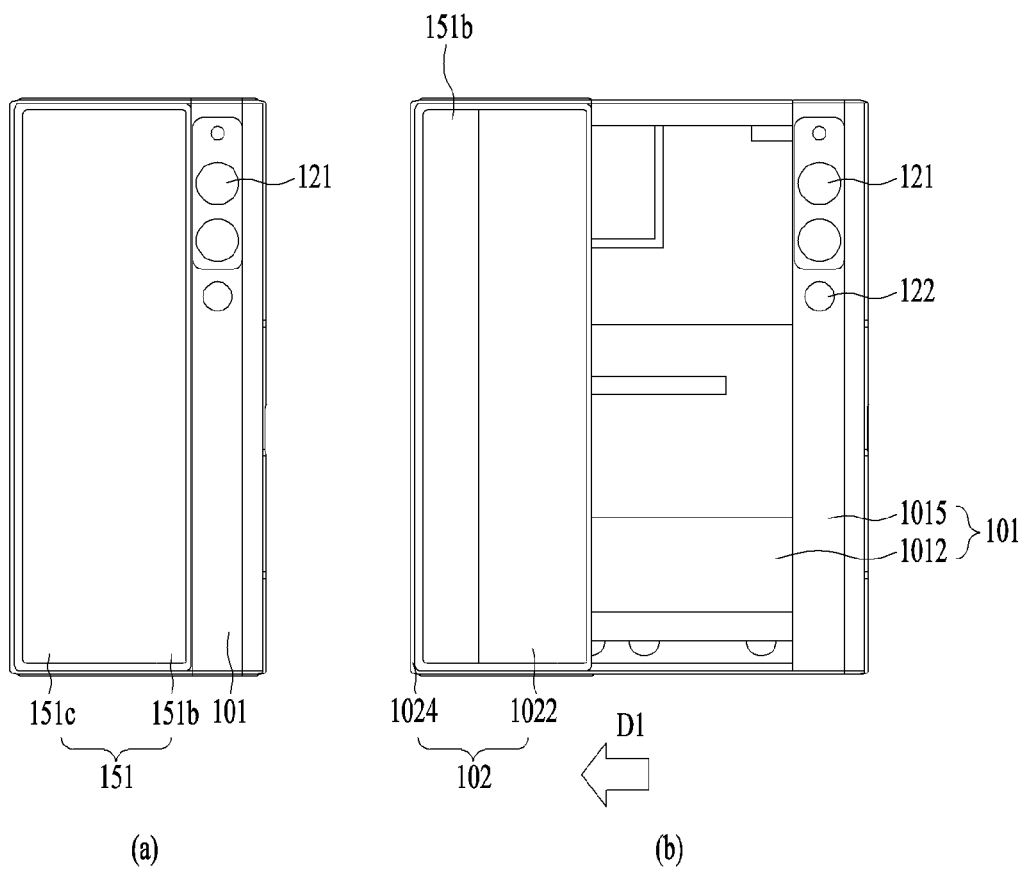
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
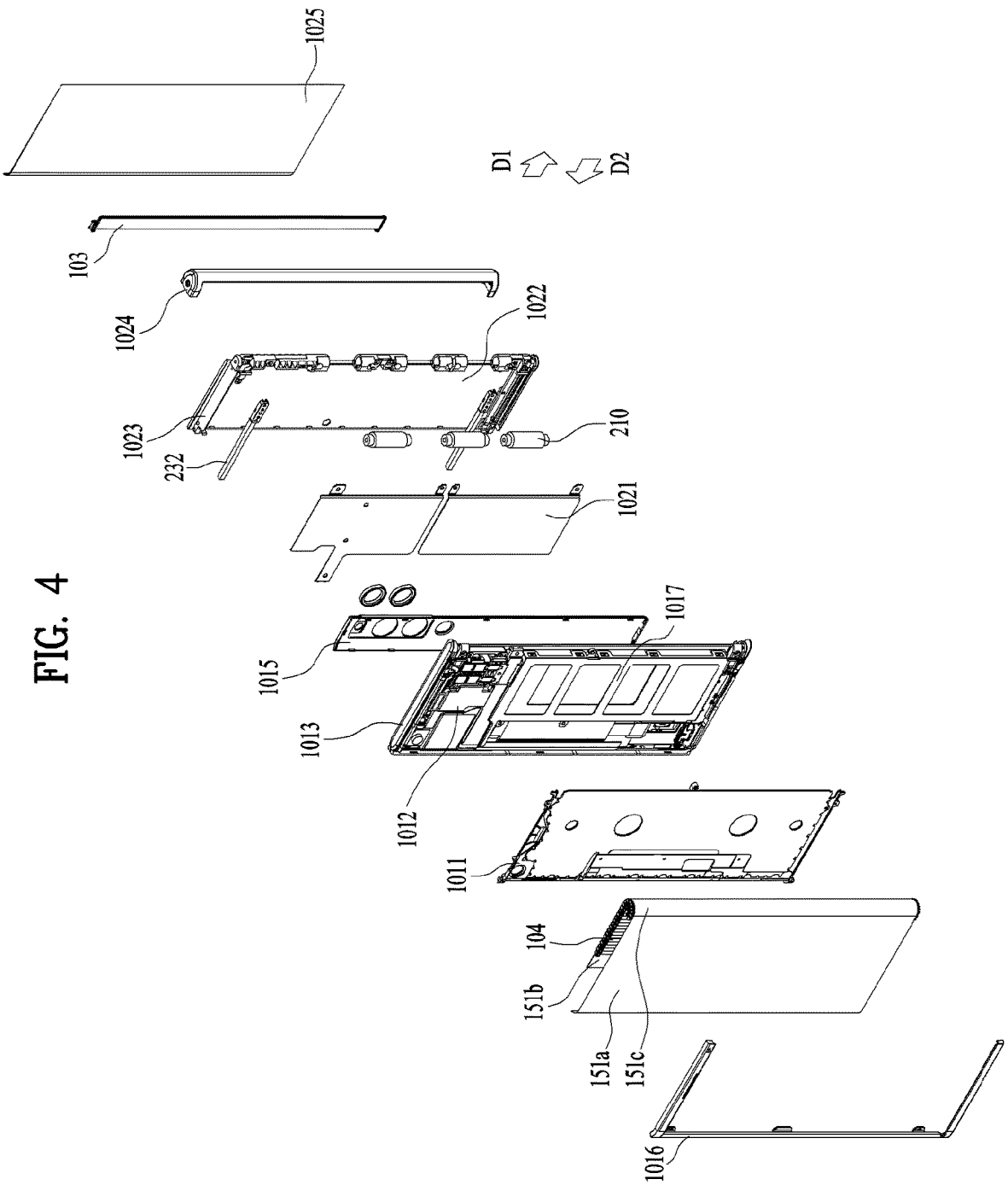
FIGS. 4 and 5 are exploded perspective views of the mobile terminal in accordance with an embodiment.
Figure 5:
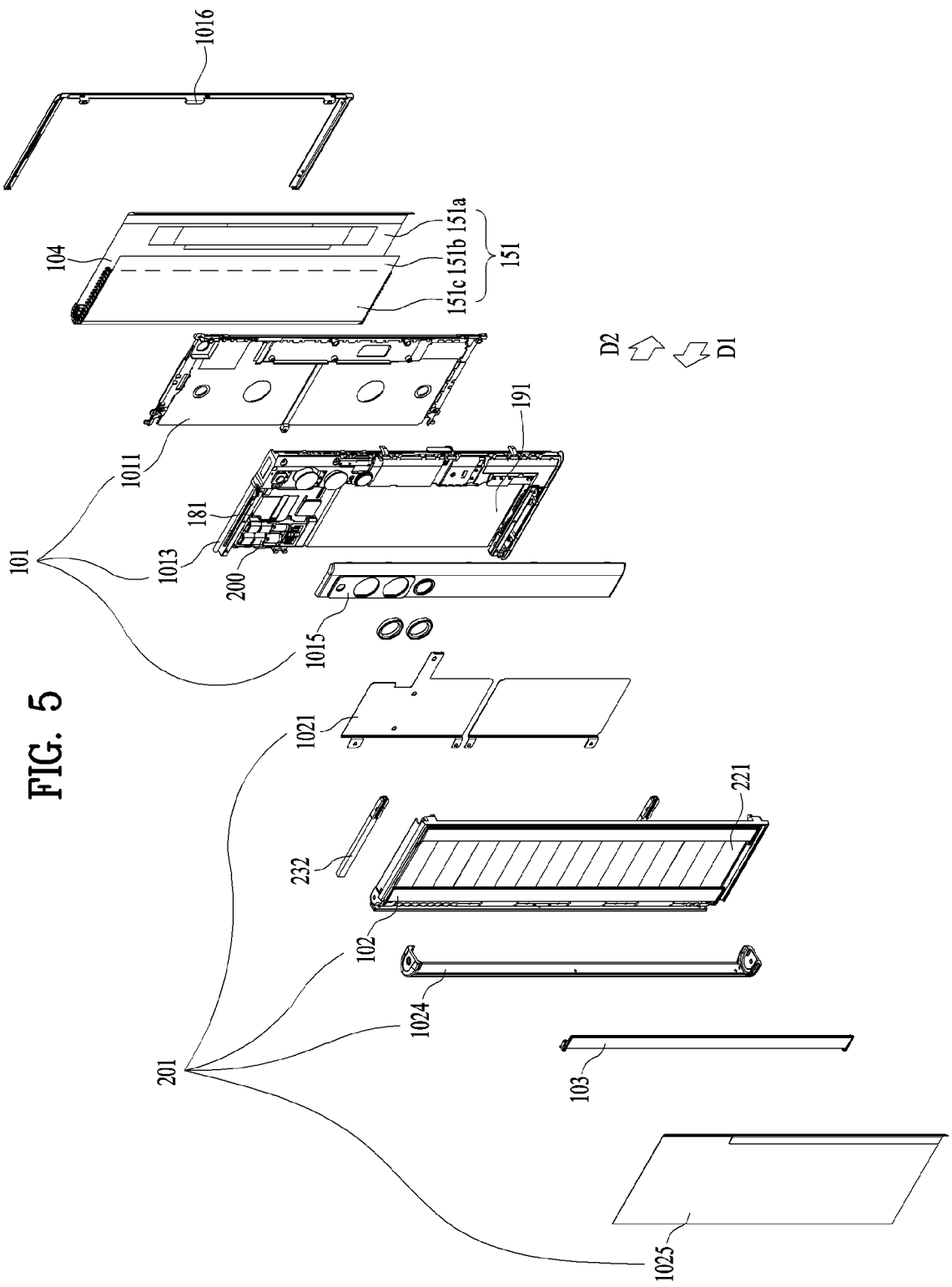

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151*a* and 151*b* and a variable portion 151*c*. The fixed portion 151*a* and 151*b* means a portion fixed to the frame. Because of being fixed to the frame, the fixed portion 151*a* and 151*b* maintains a constant shape without changing a bending degree. On the other hand, the variable portion 151*c* means a portion in which a bending angle or a position of the bent portion changes. The variable portion 151*c* in which the position or bending angle of the bent portion changes requires a structure for supporting a rear face of the variable portion 151*c* in response to the change.

The fixed portion 151*a*, 151*b* is coupled to the first frame of the display unit and is always positioned on the front face of the display unit to form a portion of the front face of the display unit. The variable portion 151*c* includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151*c* may be the front face and another portion of the variable portion 151*c* may be the rear face based on the first and second states. The variable portion 151*c* is positioned in the first direction with respect to the fixed portion 151*a*, 151*b* relative to the mobile terminal, and an end of the variable portion 151*c* is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(*a*), and may be exposed rearward in the second state as shown in FIG. 3(*b*).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

Figure 6:
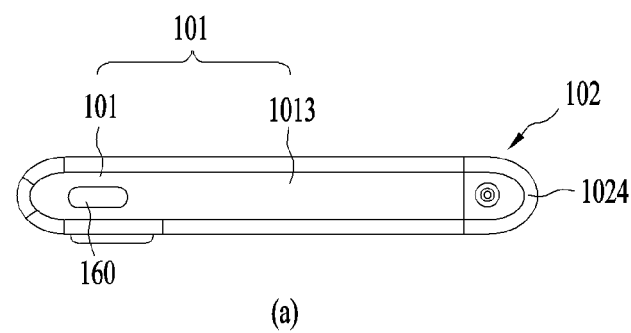
FIG. 6 is a side view of the mobile terminal as viewed from a third direction.
Figure 6:
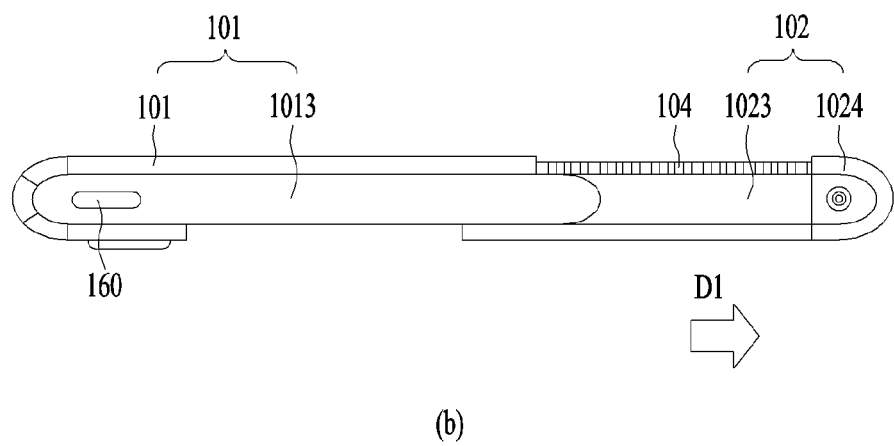

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151*a* disposed on the front of the mobile terminal 100, a second region 151*b* coupled to a slide frame 103 positioned on the rear of the mobile terminal 100, and a third region 151*c* located between the first region 151*a* and the second region 151*b* and bent around the roller 210. The third region 151*c* may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151*a*, 151*b*, and 151*c* may be connected to each other, and may form a continuous body of the display unit 151. In addition, as described above, for the movement of the third region 151*c* toward the front face or the rear face of the mobile terminal 100 depending on the moving direction of the second frame 102, the first region 151*a* may be fixed so as not to move to the front face of the mobile terminal 100, and the second region 151*b* may be provided to be movable on the rear face of the mobile terminal. Such configuration of the display unit 151 will be described in more detail below.

The first region 151*a* may be disposed on the front face of the mobile terminal 100, more specifically, the first frame 101, that is, on the front face of the first front portion 1011. The first region 151*a* is fixed to the first frame 101, that is, the front face of the first front portion 1011 so as not to be moved during the movement of the second frame 102, and thus, the first region 1511 may always be exposed to the front face of the mobile terminal 100.

The third region 151*c* may be adjacent to the first region 151*a* in a direction of the second side edge 151*e*, and may extend into the second frame 102 and rolled on the roller 210. The third region 151*c* may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151*c* is also disposed on the rear face of the first frame 101.

The second region 151*b* may be adjacent to the third region 151*c* and may be disposed on the rear face of the mobile terminal 100, more specifically, on the second frame 102, that is, the rear face of the second rear portion 1022 thereof. The second region 151*b* may be coupled to the slide frame 103 without being directly coupled to the second frame 102.

As a result, the first region 151*a* may be disposed on the front face of the mobile terminal 100 and may be always exposed to the front face regardless of the movement of the second frame 102, and the second region 151*b* may be disposed on the rear face of the mobile terminal 100 and may be always exposed to the rear face regardless of the movement of the second frame 102. In addition, the third region 151*c* may be disposed between the first and second regions 151*a* and 151*b*, and may be selectively placed on the front face or the rear face of the mobile terminal 100 depending on the moving directions D1 and D2 of the second frame 102.

Because of such selective placement of the third region 151*c*, as shown in FIG. 4B, the first rear portion 1012 of the first frame 101 may be exposed to the outside of the mobile terminal 100 because the first rear portion 1012 is covered by the second and third regions 151*b* and 151*c* and the second rear portion 1022 of the display unit 151 in the first state, but, in the second state, the third region 151*c* moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151*c* of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151*c* may be rolled on the roller 210 and bent in the second frame 102. When converting from the first state to the second state, the third region 151*c* may extend from the second frame 102 to the front face of the mobile terminal 100 while being rolled on the roller 210 in one direction. On the other hand, when converting from the second state to the first state, the third region 151*c* may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

Figure 7:
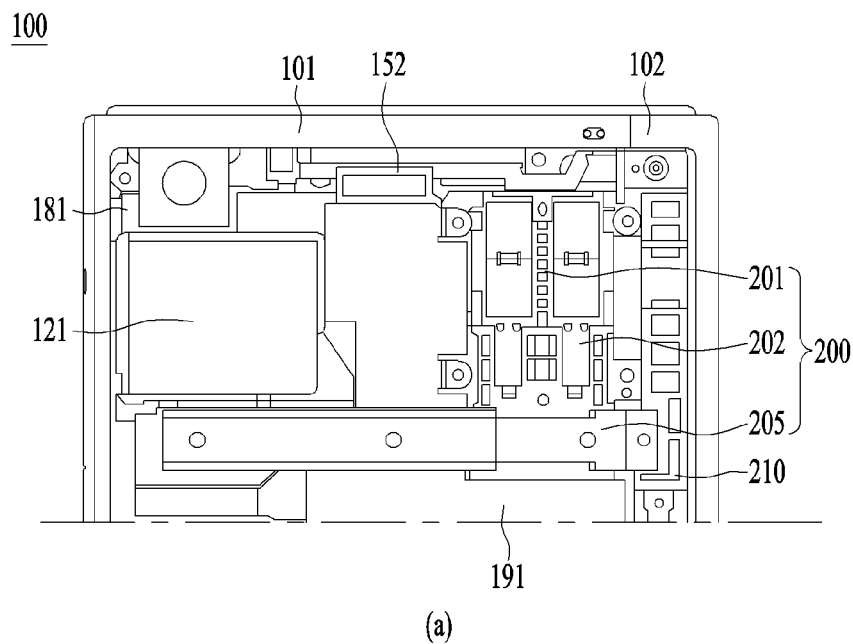
FIG. 7 is a view showing a driving unit of the mobile terminal in accordance with an embodiment.
Figure 7:
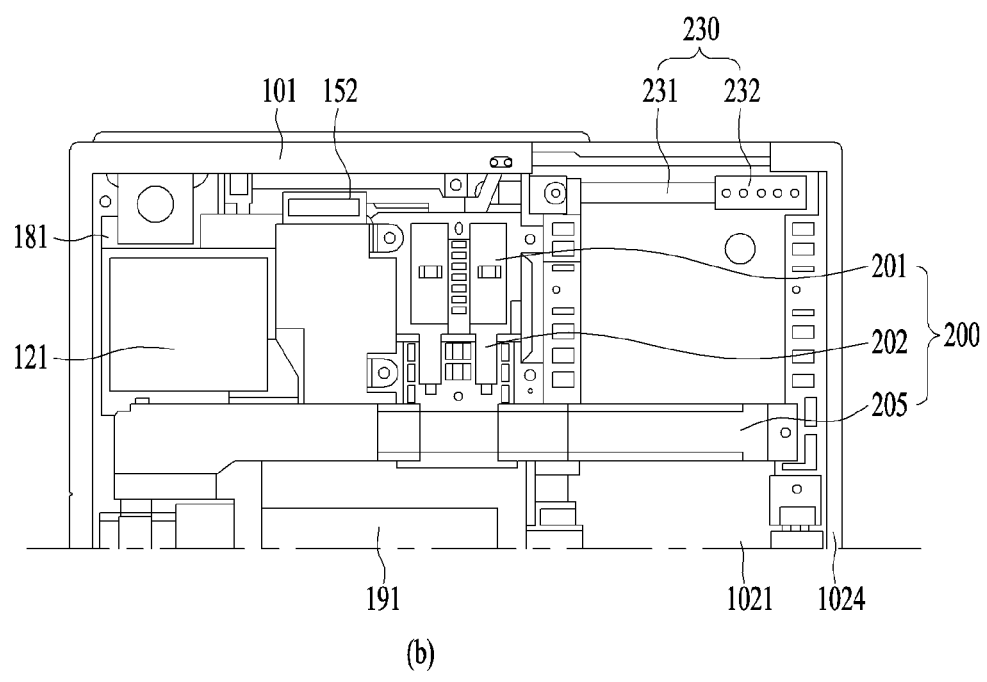

FIG. 7 is a view showing a driving unit 200 of the mobile terminal 100 in accordance with an embodiment. FIG. 7(a) shows the first state and FIG. 7(b) shows the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
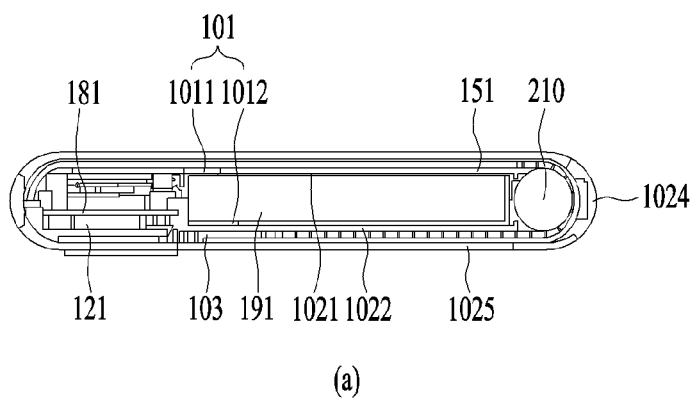
FIG. 8 is a cross-sectional view taken along lines A-A and B-B in FIG. 2.
Figure 8:
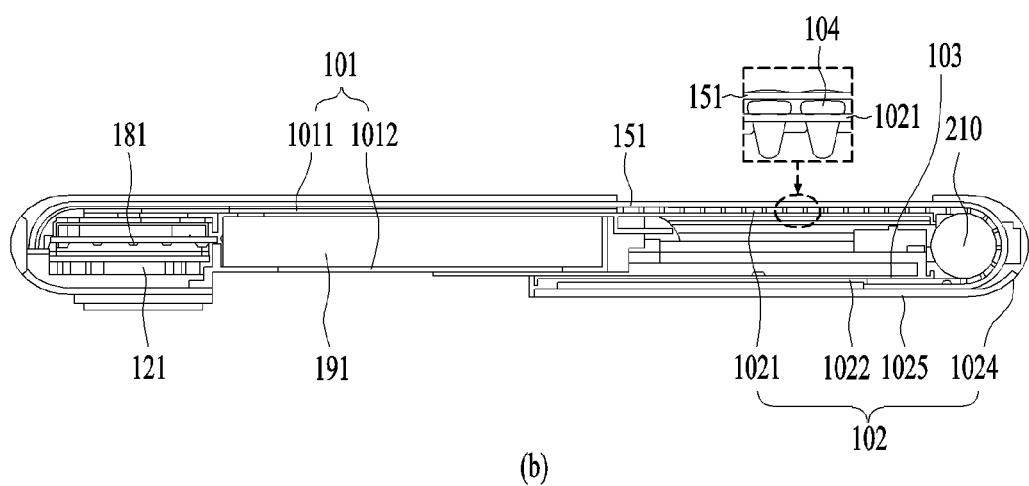

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(*b*), when switch to the second state occurs, the rolling plate 104 may move to the front and the rolling plate 104 may be positioned on the front portion of the second frame 102.

The third region 151*c* of the display unit 151 in which the rolling plate 104 is positioned is a portion where bending deformation occurs when switch from the first state to the second state occurs. Accordingly, the rolling plate 104 may be deformed according to deformation of the third region 151*c*. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
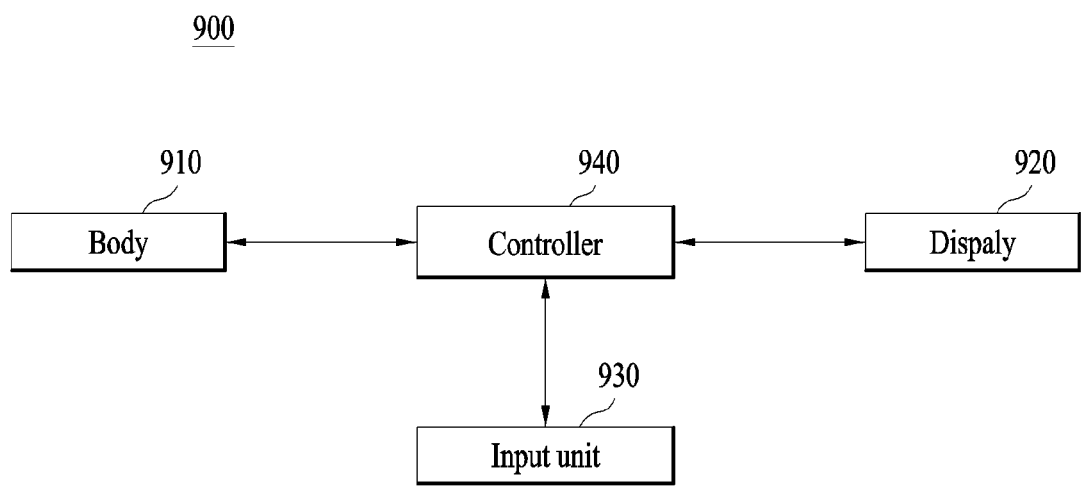
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, and a controller 940.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

The mobile terminal 900 may further include a driving unit (not illustrated) for causing the second frame to be extended or contracted. Here, the driving unit may be implemented as the driving unit 200 of FIG. 7.

The mobile terminal 900 may operate in an enlarged display mode as the second frame is extended, and may operate in a reduced display mode as the second frame is contracted. The enlarged display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, in an embodiment of the present disclosure, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

As the second frame is contracted, the display portion positioned on the front of the body 910 may move to the side of the body 910 or to the rear of the body 910 via the side of the body 910.

In one embodiment of the present disclosure, the state in which the second frame is not extended, that is, the state in which the mobile terminal 900 is in the reduced display mode may be defined as the default state. In addition, the state in which the mobile terminal 900 is in the reduced display mode may be referred to as a first mode and the state in which the mobile terminal 900 is in the enlarged display mode may be referred to as a second mode.

The display 920 may display the visual information. In this regard, the visual information may include a text, an indicator, an icon, a content, an application, an image, and a video. In addition, the display 920 may output the visual information on the screen in response to a control command of the controller 940.

In particular, the display 920 may divide a region in the enlarged display mode. More specifically, the display 920 may output different visual information in the divided regions. For example, the display 920 may output a first application in a first region, a second application in a second region, and a third application in a third region.

In addition, the display 920 may output the visual effect. More specifically, the display 920 may give an effect to the output visual information rather than simply outputting the visual information. For example, the display 920 may display in black and white, blur, or dim the output application. In addition, the display 920 may output the visual effect only in a partial region.

In particular, the display 920 may be implemented as a touch screen by forming a mutual layer structure or integrally formed with the touch sensor as described above in FIG. 1, but an output function and a touch function may be controlled independently of each other. This will be described in detail in the drawings below.

The input unit 930 may receive various inputs from the user for the mobile terminal 900 and deliver input results such that the controller 940 may perform corresponding operations. For example, the input unit 930 may receive an input signal for touching the first region from the user, and may deliver the input result to the controller 940 such that the controller 940 may determine that the first region is selected.

In one embodiment of the present disclosure, the input unit 930 may be disposed in the display 920 and implemented as the touch screen. In this regard, the input unit 930 is disposed in the display 920, but is able to be controlled individually of the output function of the display 920. In addition, the input unit 930 may be implemented as the input unit 120 in FIG. 1.

The input unit 930 may sense the touch input from the user. In this regard, the input unit 930 may sense a point where the touch input is sensed, a touched area, a touch pressure, and the like together.

The input unit 930 may simply receive an input signal for touching the icon or the image from the user, and the input unit 930 may receive a touch drag input signal for touching the icon or the image and then dragging the icon or the image to another location. In addition, the input unit 930 may receive a touch drag input signal for touching and then dragging a button, and the controller 940 may obtain a drag distance and a drag direction of the received touch drag input signal.

The controller 940 may process data, control each unit of the mobile terminal 900 described above, and control data transmission/reception between the units. In the present disclosure, the controller 940 may be implemented as the controller 180 in FIG. 1.

Operations performed by the mobile terminal 900 may be controlled by the controller 940. However, for convenience, in the drawings and the following description, such operations are collectively referred to as being performed/controlled by the mobile terminal 900.

Hereinafter, embodiments of the present disclosure will be described with reference to FIGS. 11 to 24. In describing and understanding the embodiments of the present disclosure below, reference may be made to the contents described above with respect to FIGS. 1 to 9.

Figure 10:
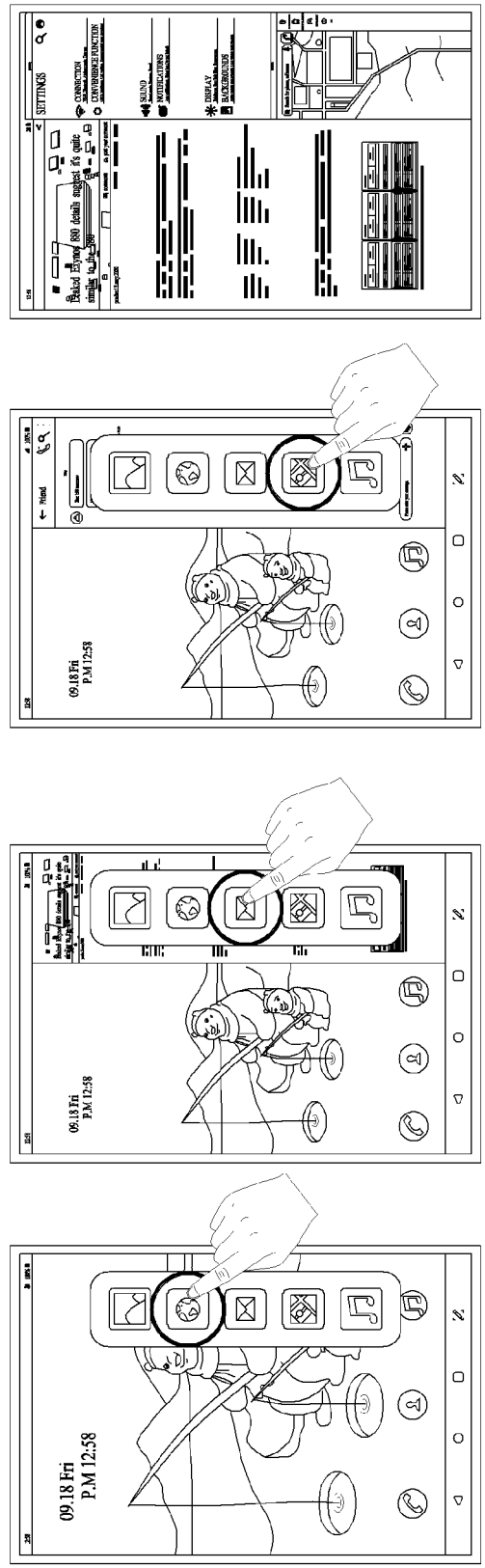
FIG. 10 is a diagram illustrating an existing problem of outputting applications by dividing a region of a display.

FIG. 10 is a diagram illustrating an existing problem of outputting applications by dividing a region of a display.

Referring to FIG. 10, the user has an inconvenience of selecting icons of applications several times to output the several applications in divided regions of the display.

More specifically, referring to first to third drawings of FIG. 10, the user may select first to third application icons output on the display of the mobile terminal, respectively, to output a first application, a second application, and a third application as shown in a fourth drawing of FIG. 10.

In addition, in the case of FIG. 10, although an operation of the user is simply illustrated, the mobile terminal has to output the first application as the user selects the first application icon, has to output the second application as the user selects the second application icon, and has to output the third application as the user selects the third application icon.

In addition, the mobile terminal must set a layout of the first to third applications depending on how the user divides the region of the display and uses the first to third applications.

In this case, the user must go through a process of repeatedly selecting the application icons and dividing the display regions in order to use the applications in the divided regions of the display. In addition, the mobile terminal may also be burdened with a work load resulted from repetitive signals from the user.

To solve such problem, the present disclosure proposes an embodiment in which the user may easily divide the region of the display and at the same time output frequently used applications at once in the divided regions.

Figure 11:
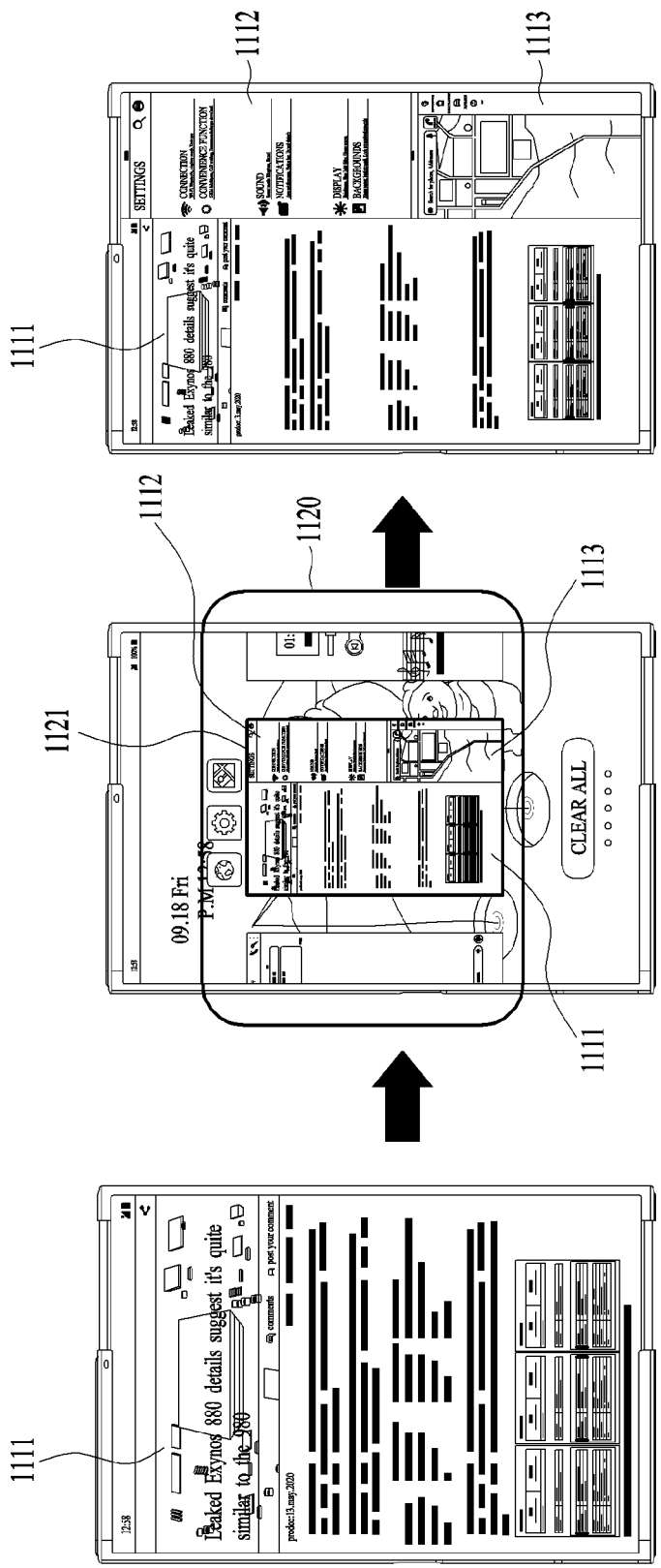
FIG. 11 is a diagram illustrating an embodiment of outputting applications based on an application layout icon in a mobile terminal according to an embodiment of the present disclosure.

FIG. 11 is a diagram illustrating an embodiment of outputting applications based on an application layout icon in a mobile terminal according to an embodiment of the present disclosure.

Referring to a first drawing of FIG. 11, the mobile terminal may output a first application 1111 on the display. In this regard, the display may be in an extended state.

In one embodiment of the present disclosure, the mobile terminal may receive a first signal (not shown) for outputting a recently used application list 1120. For example, the user may select an icon for outputting the recently used application list 1120 output on the display. In addition, the user may touch and drag the display in a predetermined direction. That is, the first signal for outputting the recently used application list 1120 may be set differently for each mobile terminal.

Referring to a second drawing of FIG. 11, the mobile terminal may output the recently used application list 1120 in response to the first signal.

In one embodiment of the present disclosure, the recently used application list 1120 may contain a first application layout icon 1121. In this regard, the first application layout icon 1121 may contain a layout of the first application 1111 and applications that have a record of being output together with the first application 1111 based on a screen division history of the first application 1111.

For example, when there is a history that the first application 1111 was output together with a second application 1112 and a third application 1113 in the divided regions within a predetermined period of time, the first application layout icon 1121 may contain the first application 1111, the second application 1112, and the third application 1113. In this regard, the first application layout icon 1121 may include a layout when the first application 1111 to the third application 1113 are output. This will be described in detail in the following drawings.

In one embodiment of the present disclosure, the mobile terminal may receive a second signal (not shown) for selecting the first application layout icon 1121. For example, the user may touch the first application layout icon 1121.

Referring to a third drawing of FIG. 11, the mobile terminal may divide the region of the display based on the first application layout icon 1121 and output at least one application in the divided regions of the display.

More specifically, when the first application layout icon 1121 contains the first application 1111, the second application 1112, and the third application 1113, the mobile terminal may output the first application 1111, the second application 1112, and the third application 1113 by dividing the region of the display in response to the second signal.

In this regard, the mobile terminal may align the first application 1111 to the third application 1113 based on the layout of the first application layout icon 1121.

Therefore, the user may output the recently used application list 1120 and then output the applications that have the record of being output together with the first application 1111 in the divided regions at once.

Figure 12:
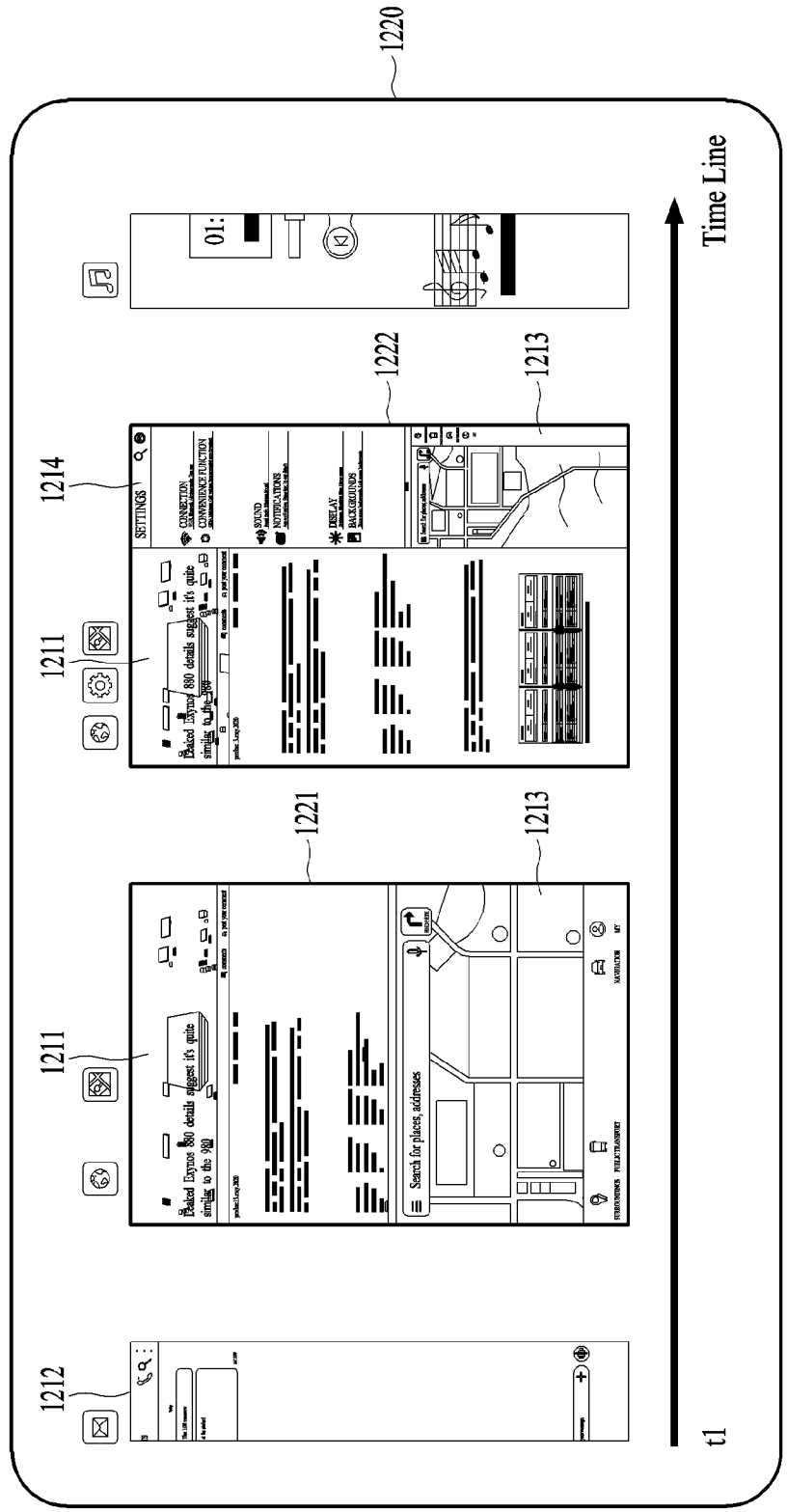
FIG. 12 is a diagram illustrating a recently used application list according to one embodiment of the present disclosure.

FIG. 12 is a diagram illustrating a recently used application list according to one embodiment of the present disclosure. It may be understood that FIG. 12 illustrates the second drawing of FIG. 11 in detail.

More specifically, the mobile terminal may receive a signal for outputting a recently used application list 1220 in a state in which a first application 1211 is being output.

In one embodiment of the present disclosure, the recently used application list 1220 may contain application layout icons 1221 and 1222 when there is a record in which the first application 1211 is output together with other applications.

The recently used application list 1220 may contain icons respectively corresponding to applications used in a chronological order from a current time t1.

For example, referring to FIG. 12, it may be seen that a second application 1212 is output before the first application 1211 is output. Accordingly, the recently used application list 1220 may contain an icon corresponding to the second application.

In addition, it may be seen that the first application 1211 and a third application 1213 were output in the divided regions of the display before the second application 1212 is output. Accordingly, the recently used application list 1220 may contain the first application layout icon 1221.

Thereafter, the icons corresponding to the applications output in the chronological order and icons corresponding to a plurality of application layouts may be contained.

That is, when there is a record in which the first application 1211 was output together with the third application 1213 and a fourth application 1214, the recently used application list 1220 may contain a second application layout icon 1222.

Figure 13:
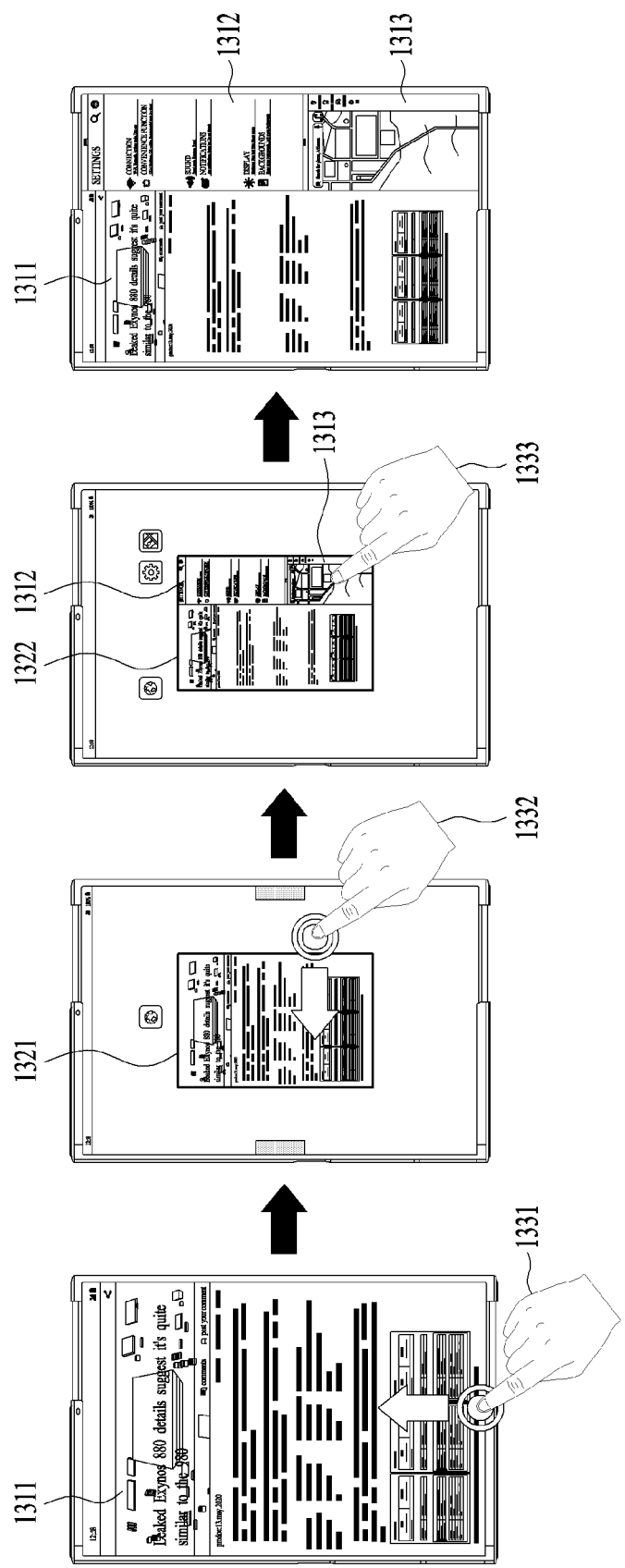
FIG. 13 is a diagram illustrating an embodiment of changing an application layout icon in a mobile terminal according to one embodiment of the present disclosure.

FIG. 13 is a diagram illustrating an embodiment of changing an application layout icon in a mobile terminal according to one embodiment of the present disclosure.

Referring to a first drawing of FIG. 13, the mobile terminal may output a first application 1311 on the display. The mobile terminal may receive a first signal 1331 for outputting a recently used application list in a state in which the first application 1311 is output. In this regard, the first signal 1331 may correspond to a touch signal of swiping in a first direction (e.g., from bottom to top).

Referring to a second drawing of FIG. 13, the mobile terminal may output the recently used application list in response to the first signal 1331. In this regard, a recently used application list 1320 may contain a first application layout icon 1321. In this regard, the first application layout icon 1321 may contain only the first application.

In one embodiment of the present disclosure, the mobile terminal may receive a second signal 1332 for selecting the first application layout icon 1321. For example, the second signal 1332 may correspond to a touch signal for swiping the first application layout icon 1321 in a second direction (e.g., from right to left).

Referring to a third drawing of FIG. 13, the mobile terminal may change the first application layout icon 1321 to a second application layout icon 1322 in response to the second signal 1332. In this regard, the second application layout icon 1322 may contain a second application 1312 and a third application 1313 that have a record of being output together with the first application 1311 based on a screen division record of the first application 1311. In addition, the second application layout icon 1322 may contain layout information in which the first application 1311 was output together with the second application 1312 and the third application 1313.

In one embodiment of the present disclosure, the mobile terminal may receive a third signal 1333 for selecting the second application layout icon 1322. For example, the third signal 1333 may correspond to a signal for touching the second application layout icon 1322.

Referring to a fourth diagram of FIG. 13, upon receiving the third signal 1333, the mobile terminal may divide the region of the display based on the second application layout icon 1322 and output the applications.

More specifically, the mobile terminal may divide the region of the extended display into three, output the first application 1311 in a first region, output the second application 1312 in the second region, and output the third application 1313 in a third region.

Figure 14:
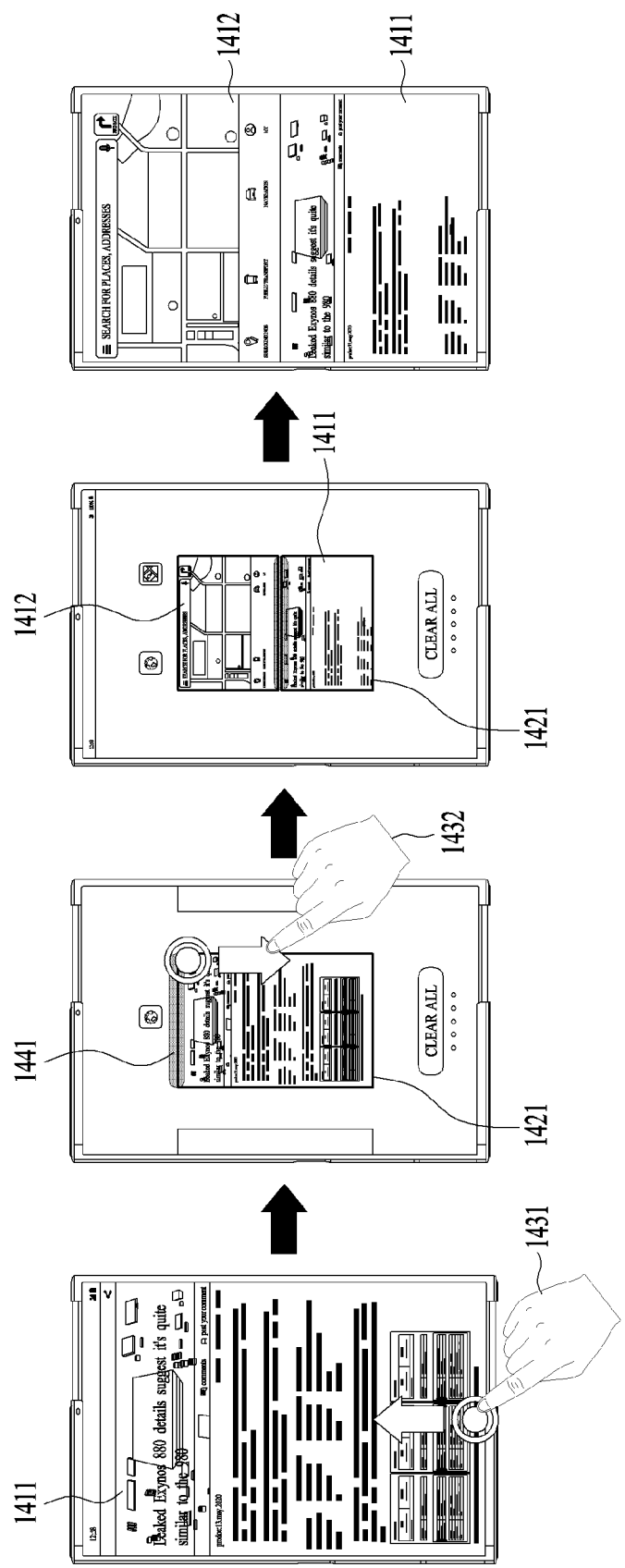
FIG. 14 is a diagram illustrating an embodiment of changing an application layout icon in a mobile terminal according to another embodiment of the present disclosure.

FIG. 14 is a diagram illustrating an embodiment of changing an application layout icon in a mobile terminal according to another embodiment of the present disclosure. Hereinafter, the embodiment of FIG. 14 may refer to the embodiment of FIG. 13.

Referring to a first drawing of FIG. 14, the mobile terminal may receive a first signal 1431 for outputting a recently used application list in a state in which a first application 1411 is output.

Referring to a second drawing of FIG. 14, the mobile terminal may output a first application layout icon 1421 upon receiving the first signal 1431.

In one embodiment of the present disclosure, the first application layout icon 1421 may contain a first visual effect 1441 unlike the embodiment of FIG. 13. In this regard, the first visual effect 1441 may be output based on a screen division history of the first application 1411.

More specifically, when there is a record in which the first application 1411 is output in a lower region among the divided regions of the extended display, the mobile terminal may output the first visual effect 1441 at an upper end of the first application layout icon 1421. Therefore, the user may identify that there is a record in which another application was output in a region above the first application 1411.

Accordingly, in one embodiment of the present disclosure, the mobile terminal may receive a second signal 1432 for selecting the first visual effect 1441. For example, the second signal 1432 may correspond to a touch signal for selecting the first visual effect 1441 and then dragging the first visual effect 1441 in a downward direction.

More specifically, the user may check the record in which another application was output in the region above the first application 1411 via the first visual effect 1441 being output at the upper end of the first application layout icon 1421. Accordingly, the user may drag and touch the first visual effect 1441.

Referring to a third drawing of FIG. 14, the mobile terminal may change the first application layout icon 1421 to a second application layout icon 1422 in response to the second signal 1432. In this regard, the second application layout icon 1422 may correspond to an icon containing the first application 1411 and a second application 1412. In addition, because the second application layout icon 1422 is output based on the first visual effect 1441, the mobile terminal may output the second application layout icon 1422 as an icon corresponding to the first application 1411 at the bottom and the second application 1412 at the top.

In addition, in another embodiment of the present disclosure, when outputting the second application layout icon 1422, the mobile terminal may output the first visual effect 1441 between the icon corresponding to the first application 1411 and the icon corresponding to the second application 1412.

Referring to a fourth drawing of FIG. 14, upon receiving a third signal (not shown) for selecting the changed second application layout icon 1422, the mobile terminal may divide the region of the extended display, output the second application 1412 in the upper region, and output the first application 1411 in the lower region.

Figure 15:
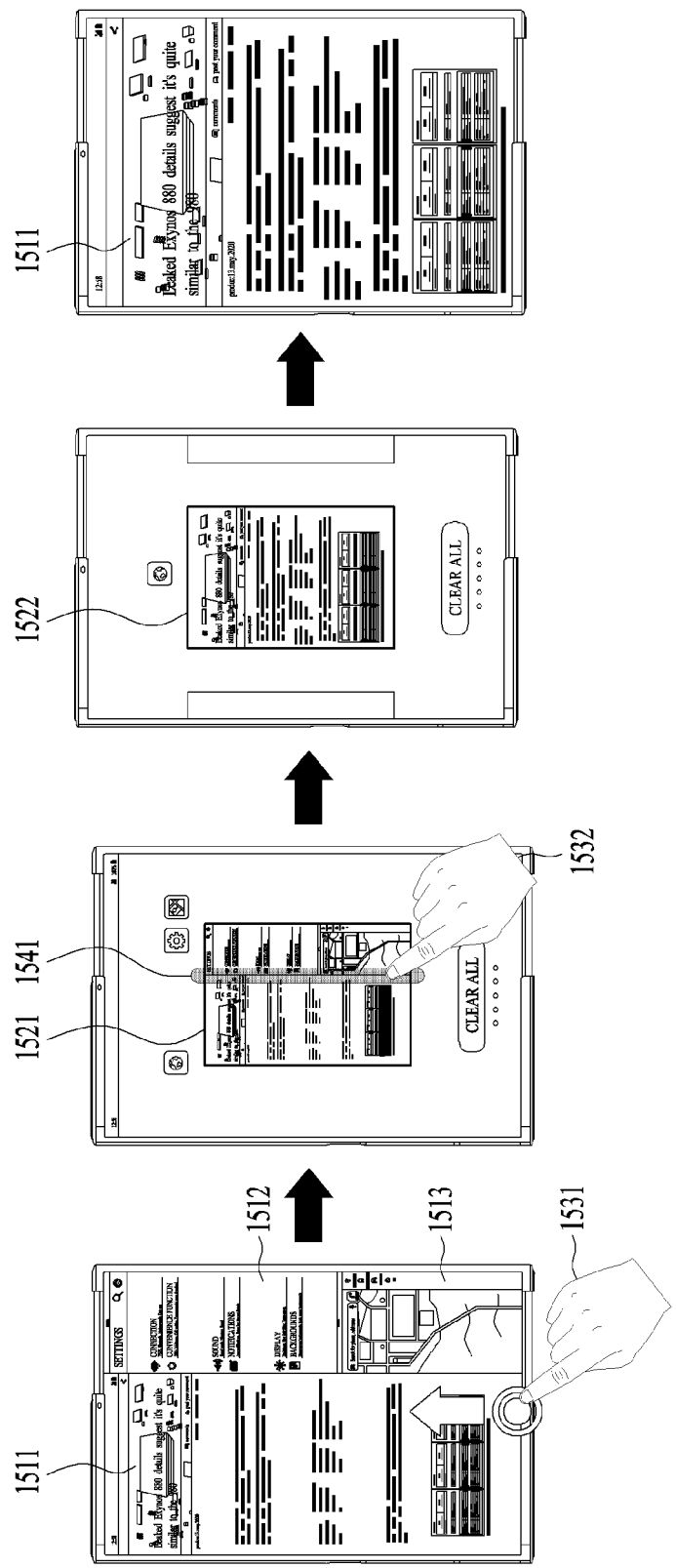
FIG. 15 is a diagram illustrating an embodiment of changing a divided shape of an application layout icon in a mobile terminal according to one embodiment of the present disclosure.

FIG. 15 is a diagram illustrating an embodiment of changing a divided shape of an application layout icon in a mobile terminal according to one embodiment of the present disclosure. That is, the embodiment of FIG. 15 may illustrate an embodiment opposite to the embodiment of FIGS. 13 and 14.

Referring to a first drawing of FIG. 15, the mobile terminal may output a first application 1511, a second application 1512, and a third application 1513 in the region of the extended display. In this regard, the mobile terminal may output the first application 1511 to the third application 1513 by dividing the screen.

In the state in which the plurality of applications are output, the mobile terminal may receive a first signal 1531 for outputting a recently used application list.

Referring to a second drawing of FIG. 15, the mobile terminal may output a first application layout icon 1521 in response to the first signal 1531. In this regard, the first application layout icon 1521 may contain icons corresponding to the first application 1511, the second application 1512, and the third application 1513, respectively.

In one embodiment of the present disclosure, the mobile terminal may output a first visual effect 1541 on the first application layout icon 1521. In this regard, the first visual effect 1541 may be output between the icon corresponding to the first application 1511 and the icons corresponding to the second application 1512 and third application 1513.

In one embodiment of the present disclosure, the mobile terminal may receive a second signal 1532 for selecting the first visual effect 1541. In this regard, the second signal 1532 may correspond to a touch input signal for selecting the first visual effect 1541 and then dragging the first visual effect 1541 to the right.

Referring to a third drawing of FIG. 15, the mobile terminal may change the first application layout icon 1521 to a second application layout icon 1522 in response to the second signal 1532.

More specifically, because the mobile terminal has responded to the second signal 1532 corresponding to the touch signal for dragging the first visual effect 1541 to the right in the first application layout icon 1521, the mobile terminal may only output the icon corresponding to the first application 1511 in the second application layout icon 1522.

Referring to a fourth drawing of FIG. 15, upon receiving a third signal (not shown) for selecting the changed second application layout icon 1522, the mobile terminal may output the first application 1511 in a full screen on the display.

Figure 16:
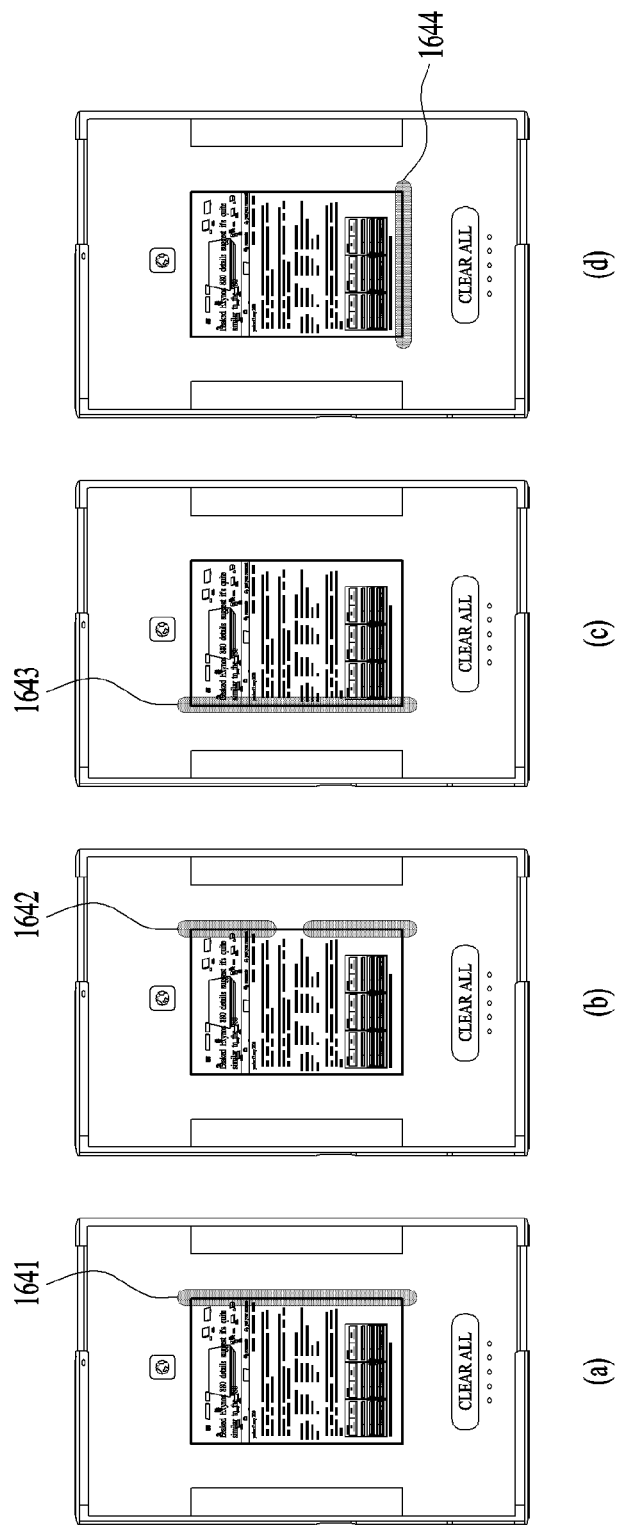
FIG. 16 is a diagram illustrating various embodiments of outputting visual effects in a mobile terminal according to one embodiment of the present disclosure.

FIG. 16 is a diagram illustrating various embodiments of outputting visual effects in a mobile terminal according to one embodiment of the present disclosure.

(a) to (d) in FIG. 16 are diagrams illustrating various embodiments of the above-described application layout icon. Therefore, the state in which the application outputs the application layout icon may be assumed. In addition, the application layout icons of (a) to (d) in FIG. 16 show only the icon corresponding to the first application, but are also able to be applied to icons corresponding to two applications.

Referring to (a) in FIG. 16, the mobile terminal may output a first visual effect 1641 at a right region of the application layout icon. In this case, the application layout icon may indicate that there is a division record in which another application was output on a right side of the first application.

Therefore, although not shown in the drawing, when a touch signal for selecting the first visual effect 1641 and dragging the first visual effect 1641 to the left is input, the mobile terminal may divide the screen into left and right regions, output the first application in the left region, and output another application in the right region.

Referring to (b) in FIG. 16, the mobile terminal may output a second visual effect 1642 at the right region of the application layout icon. In this regard, the second visual effect 1642 may be expressed in a form of two vertical bars. In this case, the application layout icon may indicate that there is a division record in which two applications were output on the right side of the first application.

Therefore, when a touch signal for selecting the second visual effect 1642 and then dragging the second visual effect 1642 to the left is input, the mobile terminal may divide the screen into three regions, output the first application in a left region, output the second application in an upper right region, and output the third application in a lower right region.

Referring to (c) in FIG. 16, the mobile terminal may output a third visual effect 1643 at a left region of the application layout icon. In this regard, the third visual effect 1643 may be expressed in a form of a single vertical bar. In this case, the application layout icon may indicate that there is a division record in which the second application was output on a left side of the first application.

Therefore, when a touch signal for selecting the third visual effect 1643 and then dragging the third visual effect 1643 to the right is input, the mobile terminal may divide the screen into two, output the second application in a left region, and output the first application in a right region.

Referring to (d) in FIG. 16, the mobile terminal may output a fourth visual effect 1644 at a bottom region of the application layout icon. In this regard, the fourth visual effect 1644 may be expressed in a form of a single horizontal bar. In this case, the application layout icon may indicate that there is a division record in which the second application was output in a region below the first application.

Therefore, when a touch signal of selecting the fourth visual effect 1644 and then dragging the fourth visual effect 1644 upward is input, the mobile terminal may horizontally divide the screen into two, output the first application in an upper region, and output the second application in a lower region.

That is, when outputting the application layout icon, the mobile terminal may output the visual effect at an edge area to indicate how the application was output in the divided region.

Figure 17:
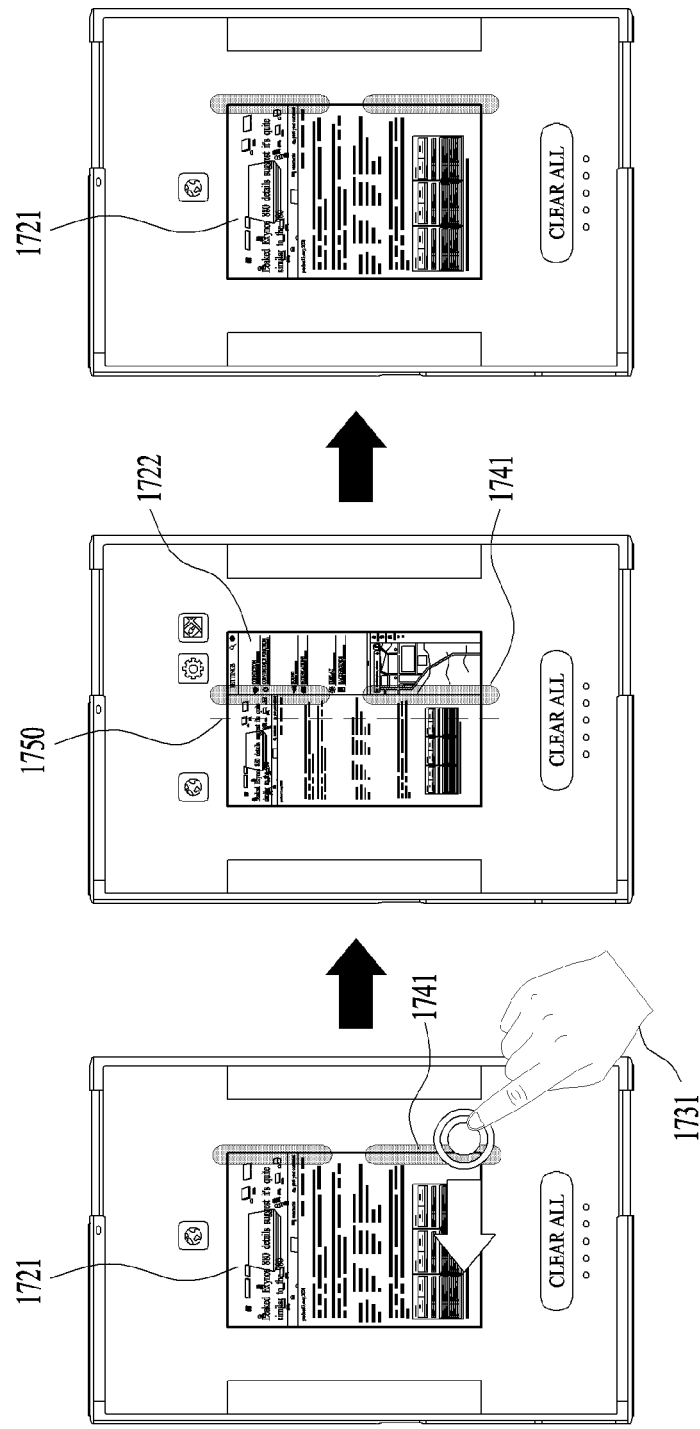
FIG. 17 is a diagram illustrating an embodiment of outputting an application layout icon as a preview based on a threshold value in a mobile terminal according to one embodiment of the present disclosure.

FIG. 17 is a diagram illustrating an embodiment of outputting an application layout icon as a preview based on a threshold value in a mobile terminal according to one embodiment of the present disclosure.

In one embodiment of the present disclosure, when the signal for selecting the visual effect is no longer applied after going beyond the threshold value, the mobile terminal may divide the region of the display based on the second application layout icon. In this regard, the second application layout icon may be created based on the screen division history of the first application. On the other hand, when the signal for selecting the visual effect does not go beyond the threshold value, the mobile terminal may output the second application layout icon as the preview.

More specifically, referring to a first drawing of FIG. 17, the mobile terminal may be in a state in which a first application layout icon 1721 is output and a visual effect 1741 is output at a right edge area of the first application layout icon 1721. Therefore, the user may check a division record in which the first application was output together with the second application and the third application on a right side thereof.

Referring to a second drawing of FIG. 17, the mobile terminal may receive a signal 1731 for selecting the visual effect 1741. In one embodiment of the present disclosure, the signal 1731 may correspond to a signal for touching the visual effect 1741 and then dragging the visual effect 1741 left and right.

In this regard, when receiving the signal 1731 for touching the visual effect 1741 and dragging the visual effect 1741 to the left, the mobile terminal may output the second application layout icon 1722 as the preview.

In this regard, the second application layout icon 1722 may be created based on the screen division history of the first application. That is, the user may identify via the visual effect 1741 that two applications were output in the divided regions on a right side of the first application. In addition, based on the signal 1731 for touching and dragging the visual effect 1741, the mobile terminal may output the second application layout icon 1722 in which the second application and the third application are output on the right side of the first application as the preview.

In one embodiment of the present disclosure, when the signal 1731 is no loner applied after going beyond a threshold value 1750, the mobile terminal may divide the region of the display based on the second application layout icon 1722. That is, when the user touches the visual effect 1741 and then drags the visual effect to the left to release the touch on a left side of the threshold value 1750, the mobile terminal may output the first application in the left region, output the second application in the upper right region, and output the third application in the lower right region.

On the other hand, referring to a third drawing of FIG. 17, when the signal 1731 is no longer applied without going beyond the threshold value 1750, the mobile terminal may terminate the preview of the second application layout icon 1722 and output the first application layout icon 1721.

Figure 18:
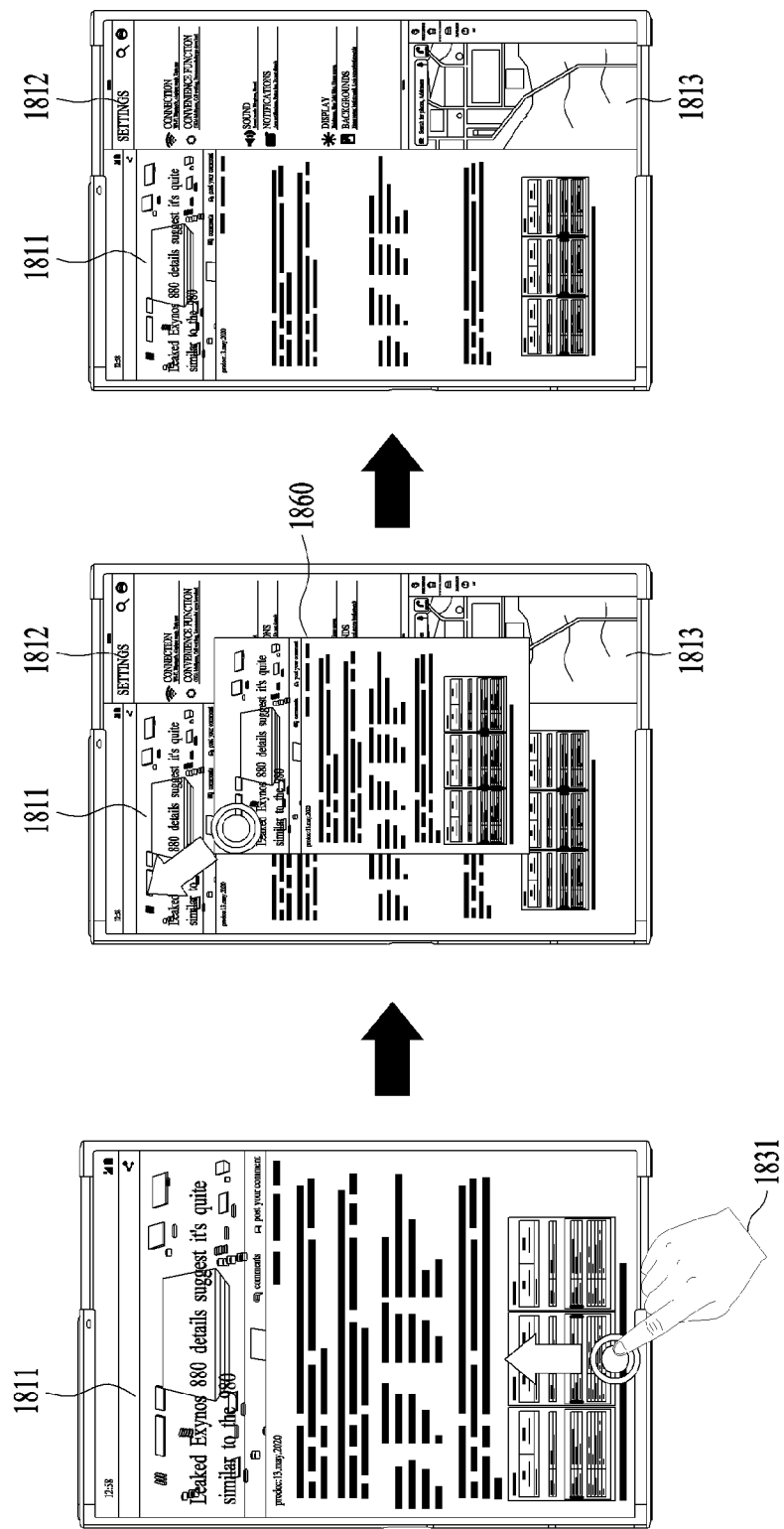
FIG. 18 is a diagram illustrating an embodiment of outputting a screen division history as a background screen in a mobile terminal according to one embodiment of the present disclosure.

FIG. 18 is a diagram illustrating an embodiment of outputting a screen division history as a background screen in a mobile terminal according to one embodiment of the present disclosure.

Referring to a first drawing of FIG. 18, the mobile terminal may receive a first signal 1831 for outputting a recently used application list in a state in which a first application 1811 is output.

Referring to a second drawing of FIG. 18, unlike the above-described embodiment, the mobile terminal may output the first application 1811 as a pop-up window 1860 in response to the first signal 1831.

In one embodiment of the present disclosure, the mobile terminal may output applications corresponding to a screen division history of the first application 1811 as a background screen of the pop-up window 1860.

More specifically, the mobile terminal may output the first application 1811 in a left region of the background screen, output the second application 1812 in an upper right region of the background screen, and output the third application 1813 in a lower right region of the background screen based on the screen division history of the first application 1811.

In addition, the mobile terminal may receive a second signal (not shown) for selecting the pop-up window 1860 and then dragging the pop-up window 1860.

Referring to a third drawing of FIG. 18, upon receiving the second signal, the mobile terminal may output the first application 1811 in the left region, output the second application 1812 in the upper right region, and output the third application 1813 in the lower right region, as being output on the background screen of the pop-up window 1860 in the second drawing of FIG. 18.

In this regard, the second signal may correspond to a touch signal for selecting the pop-up window 1860 and then dragging the pop-up window 1860 in a predetermined direction.

Figure 19:
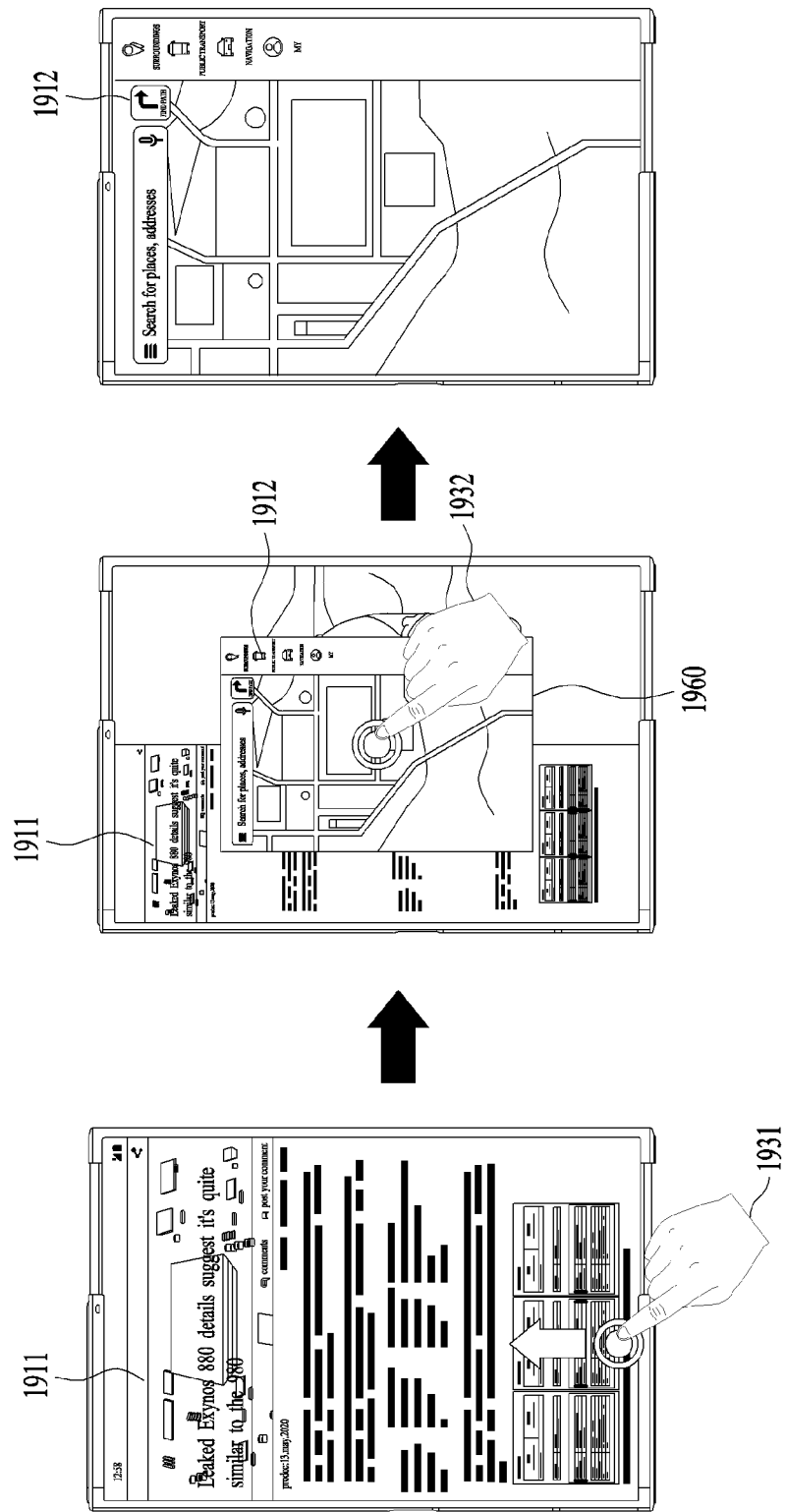
FIG. 19 is a diagram illustrating another embodiment of outputting a screen division history as a background screen in a mobile terminal according to one embodiment of the present disclosure.

FIG. 19 is a diagram illustrating another embodiment of outputting a screen division history as a background screen in a mobile terminal according to one embodiment of the present disclosure.

Referring to a first drawing of FIG. 19, the mobile terminal may receive a first signal 1931 in a state in which a first application 1911 is being output.

Referring to a second drawing of FIG. 19, the mobile terminal may output the first application 1911 as a background screen in response to the first signal 1931. More specifically, when outputting the first application 1911 as the background screen, the mobile terminal may output a second application 1912 as a pop-up window 1960 based on a screen division history of the first application 1911.

That is, because there is a history in which the first application 1911 was output in a left region and the second application 1912 is output in a right region in the screen division history of the first application 1911, the mobile terminal may output the first application 1911 in the left region of the background screen and output the second application 1912 as the pop-up window 1960 in response to the first signal 1931.

Referring to a third drawing of FIG. 19, the mobile terminal may output the second application 1912 in a full screen in response to a second signal 1932 for selecting the pop-up window 1960 in which the second application 1912 is output.

That is, the mobile terminal may show the screen division history of the first application 1911 and the second application 1960 via the background screen and the pop-up window 1960 and output only the second application 1912 in the full screen in response to the second signal 1932 for selecting the second application 1960 being output on the pop-up window 1960.

An embodiment of outputting the applications in the divided regions of the screen based on the screen division history will be described with reference to FIG. 20 below.

Figure 20:
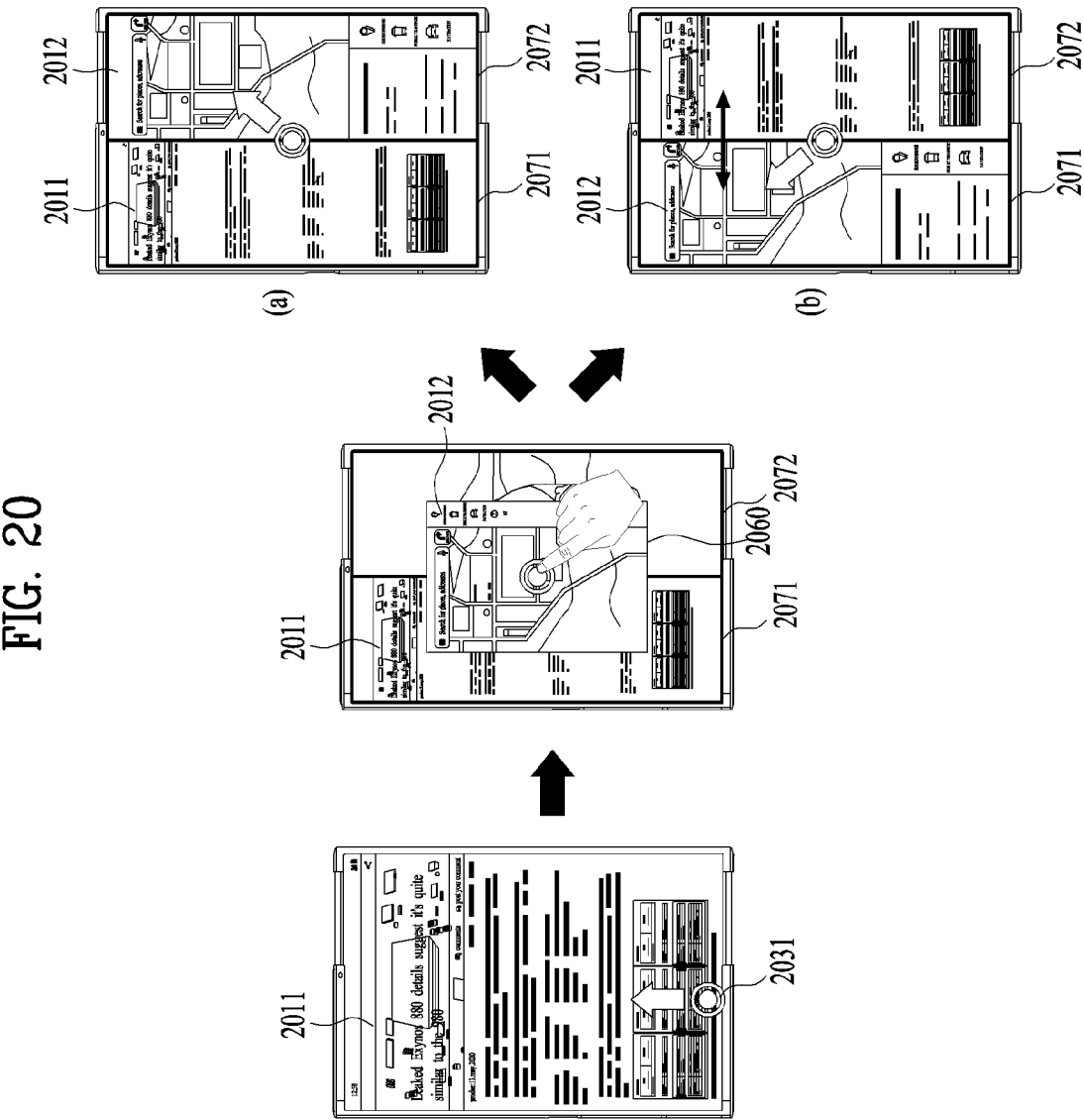
FIG. 20 is a diagram illustrating an embodiment of outputting applications in divided regions of a screen based on a screen division history in a mobile terminal according to an embodiment of the present disclosure.

FIG. 20 is a diagram illustrating an embodiment of outputting applications in divided regions of a screen based on a screen division history in a mobile terminal according to an embodiment of the present disclosure.

Referring to a first drawing of FIG. 20, the mobile terminal may receive a first signal 2031 in a state in which a first application 2011 is output.

Referring to a second drawing of FIG. 20, the mobile terminal may output the first application 2011 as a background screen in response to the first signal 2031. In addition, when outputting the first application 2011 as the background screen, the mobile terminal may output a second application 2012 on a pop-up window 2060 based on a screen division history of the first application 2011.

In the embodiment of FIG. 20, the mobile terminal may output an embodiment of (a) in FIG. 20 in response to a signal of selecting the pop-up window 2060 on which the second application 2012 is output and then dragging the pop-up window 2060 to a second region 2072, and may output an embodiment of (b) in FIG. 20 in response to a signal of dragging the pop-up window 2060 to a first region 2071.

That is, referring to (a) in FIG. 20, the mobile terminal may output the second application 2012 in the second region 2072 in response to the signal of selecting the pop-up window 2060 on which the second application 2012 is output and then dragging the pop-up window 2060 to the second region 2072. Accordingly, the mobile terminal may output the first application 2011 in the first region 2071 and output the second application 2012 in the second region 2072.

On the other hand, referring to (b) in FIG. 20, the mobile terminal may output the second application 2012 in the second region 2071 in response to the signal of selecting the pop-up window 2060 on which the second application 2012 is output and then dragging the pop-up window 2060 to the first region 2071. Accordingly, the mobile terminal may output the second application 2012 in the first region 2071 and output the first application 2012 in the second region 2072.

That is, the mobile terminal may output the second application 2012 as the pop-up window 2060 based on the screen division history of the first application 2011, and output the first application 2011 and the second application 2012 in the divided regions based on a direction in which the pop-up window 2060 on which the second application 2012 is output is dragged.

FIGS. 21A to 23B are diagrams illustrating embodiments of dividing a screen using visual effects output on an application in a mobile terminal according to an embodiment of the present disclosure.

Unlike the above-described embodiment, in the embodiments of FIGS. 21A to 23B, an embodiment of dividing the screen immediately in a state in which the mobile terminal does not output the recently used application list will be described.

Figure 21A:
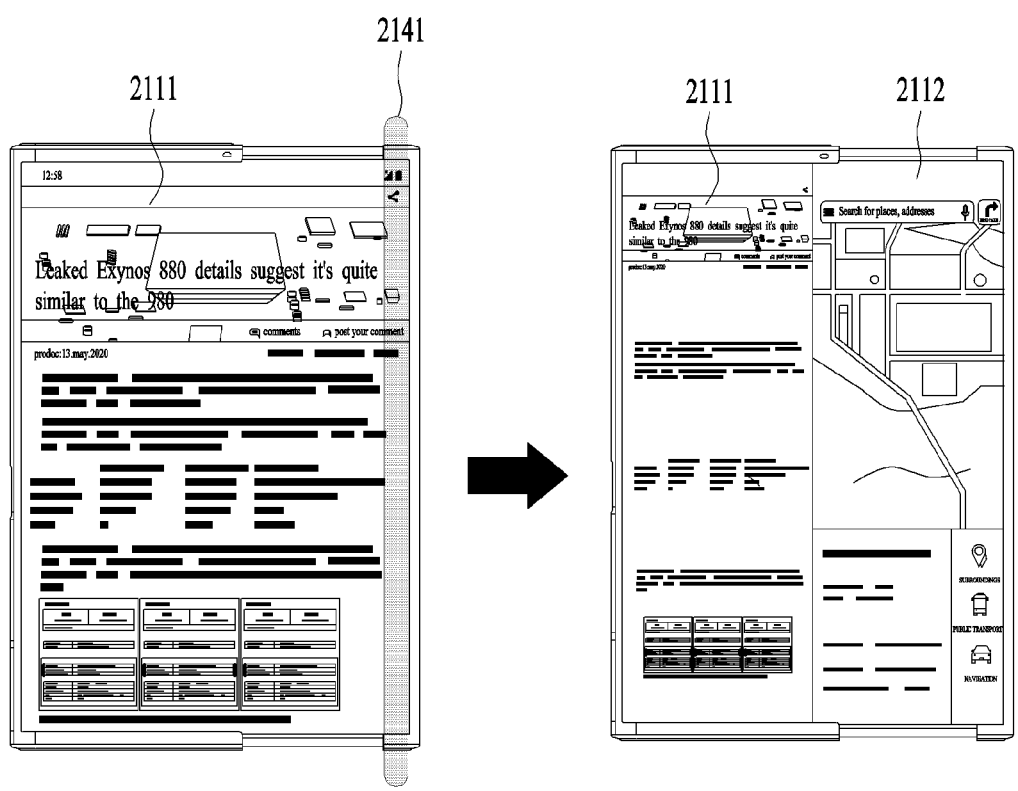
FIGS. 21A to 23B are diagrams illustrating embodiments of dividing a screen using visual effects output on an application in a mobile terminal according to an embodiment of the present disclosure.

More specifically, referring to a first drawing of FIG. 21A, the mobile terminal may output a first visual effect 2141 on a right edge surface in a state in which a first application 2111 is output. Therefore, the user may identify a screen division history in which another application was output on a right side of the first application 2111.

Referring to a second drawing of FIG. 21A, upon receiving a signal (not shown) for selecting the first visual effect 2141, the mobile terminal may divide the display based on the screen division history of the first application 2111 and then output the applications.

More specifically, the mobile terminal may output the first application 2111 in a left region and output the second application 2112 having a history of being output together with the first application 2111 in a right region.

Figure 21B:
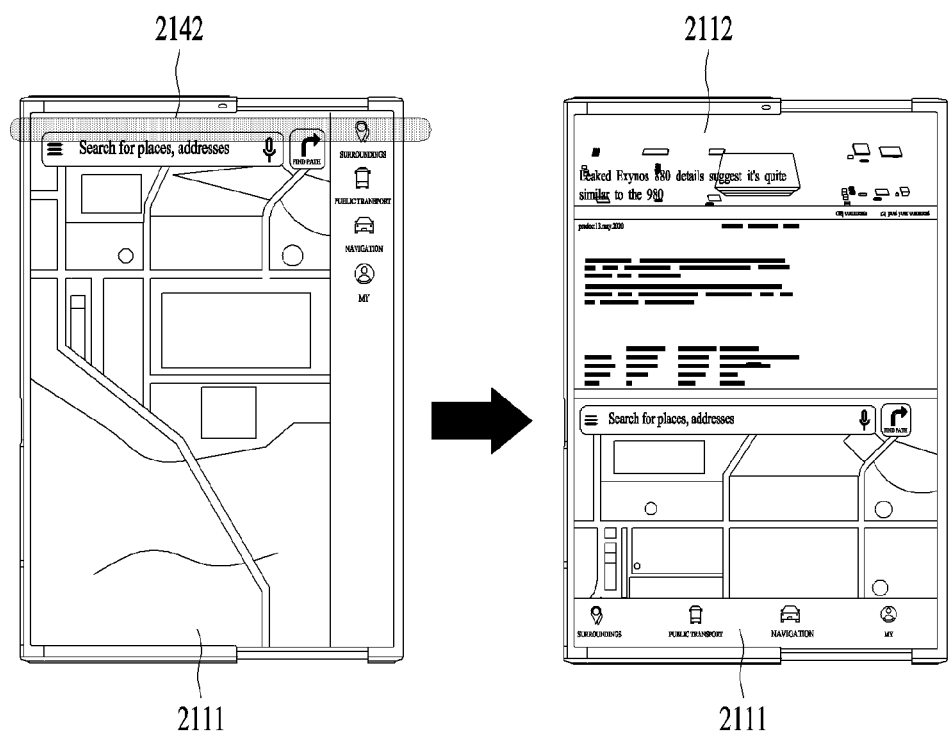

Likewise, referring to a first drawing of FIG. 21B, the mobile terminal may output a second visual effect 2142 on an upper edge surface in the state in which the first application 2111 is output. Therefore, the user may identify a screen division history in which another application was output in a region above the first application 2111.

Referring to a second drawing of FIG. 21B, upon receiving a signal for selecting the second visual effect 2142, the mobile terminal may divide the display based on the screen division history of the first application 2111 and then output the applications. That is, the mobile terminal may output the first application 2111 in a lower region and output the second application 2112 in an upper region.

That is, as shown in the embodiments of FIGS. 21A and 21B, the mobile terminal may divide the screen and output the applications based on a position of the visual effect output on the edge surface of the application.

Unlike FIGS. 21A and 21B, FIGS. 22A and 22B illustrates an embodiment in which the region of the display is divided into three regions and three applications are output.

Figure 22A:
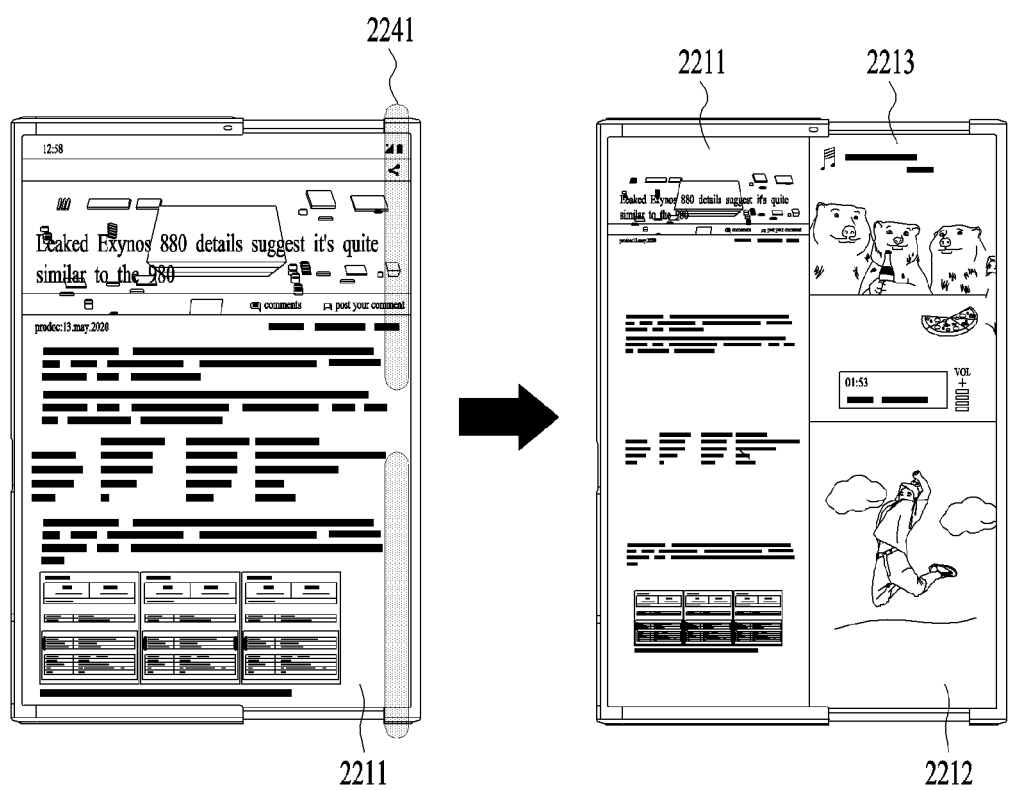

Referring to a first drawing of FIG. 22A, the mobile terminal may output a first visual effect 2241 on a right edge surface in the state in which the first application 2211 is output. In this regard, the first visual effect 2241 may be expressed in a form of two vertical divided bars, unlike in the above-described embodiments. Therefore, the user may identify a screen division history in which two different applications were output on a right side of the first application 2211.

Referring to a second drawing of FIG. 22A, upon receiving a signal for selecting the first visual effect 2241, the mobile terminal may divide the display based on the screen division history of the first application 2211 and output the applications. That is, the first application 2211 may be output in a left region, the second application 2212 may be output in a lower right region, and a third application 2213 may be output in an upper right region. In this regard, output positions of the second application 2212 and the third application 2213 may be based on the screen division history in which the second application 2212 and the third application 2213 were output together with the first application 2211.

Figure 22B:
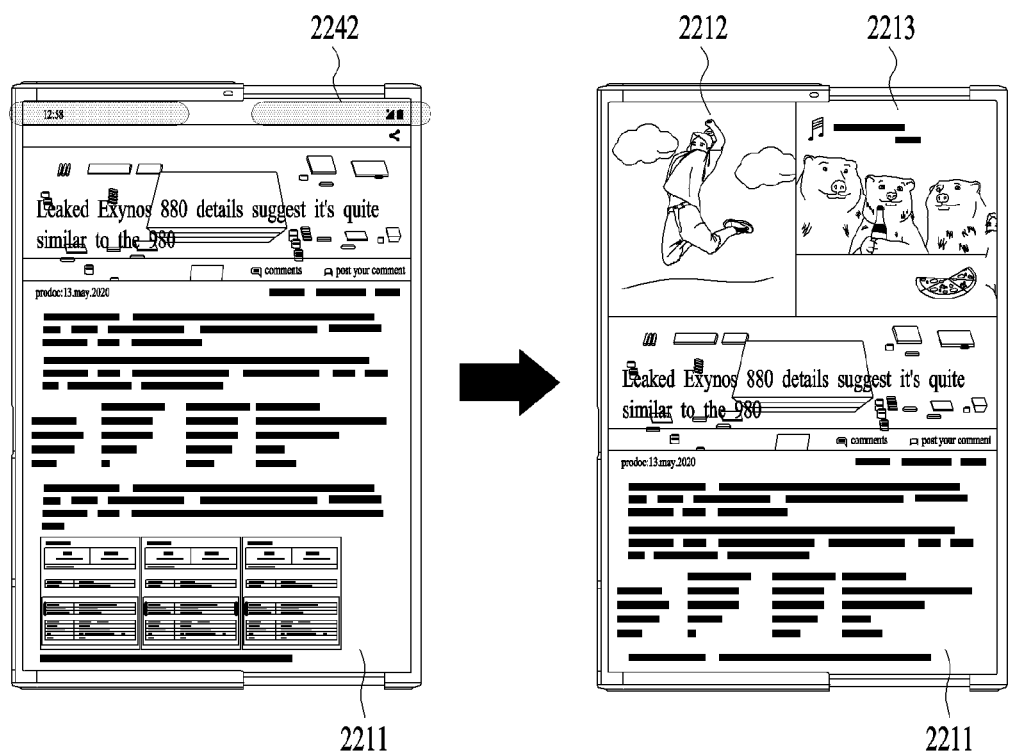

FIG. 22B illustrates an embodiment in which the region of the display is divided into three regions to output three applications as in FIG. 22A, but the screen is divided horizontally.

Referring to a first drawing of FIG. 22B, the mobile terminal may output a second visual effect 2242 on the upper edge surface in the state in which the first application 2211 is output. In this regard, the second visual effect 2242 may be expressed in a form of two horizontal divided bars. Therefore, the user may identify a screen division history in which two different applications were output in an area above the first application 2211.

Referring to a second drawing of FIG. 22B, upon receiving a signal for selecting the second visual effect 2242, the mobile terminal may divide the display based on the screen division history of the first application 2211 and output the applications. That is, the first application 2211 may be output in a lower region, the second application 2212 may be output in an upper left region, and the third application 2213 may be output in an upper right region.

Figure 23A:
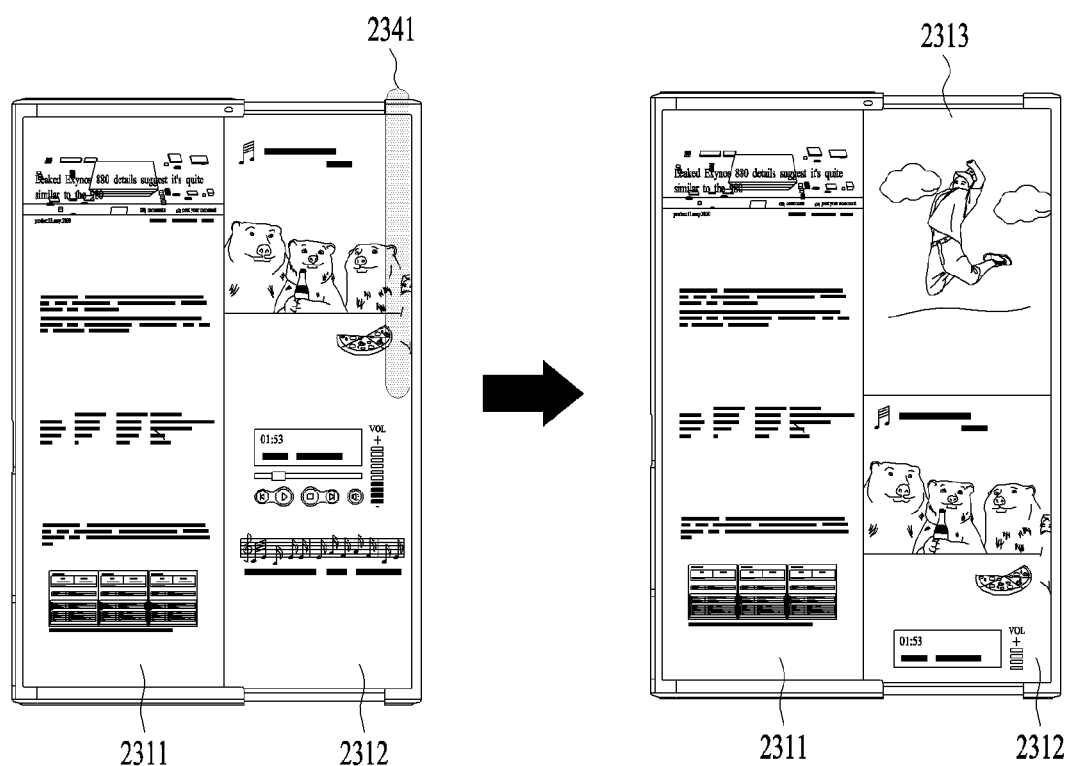
Figure 23B:
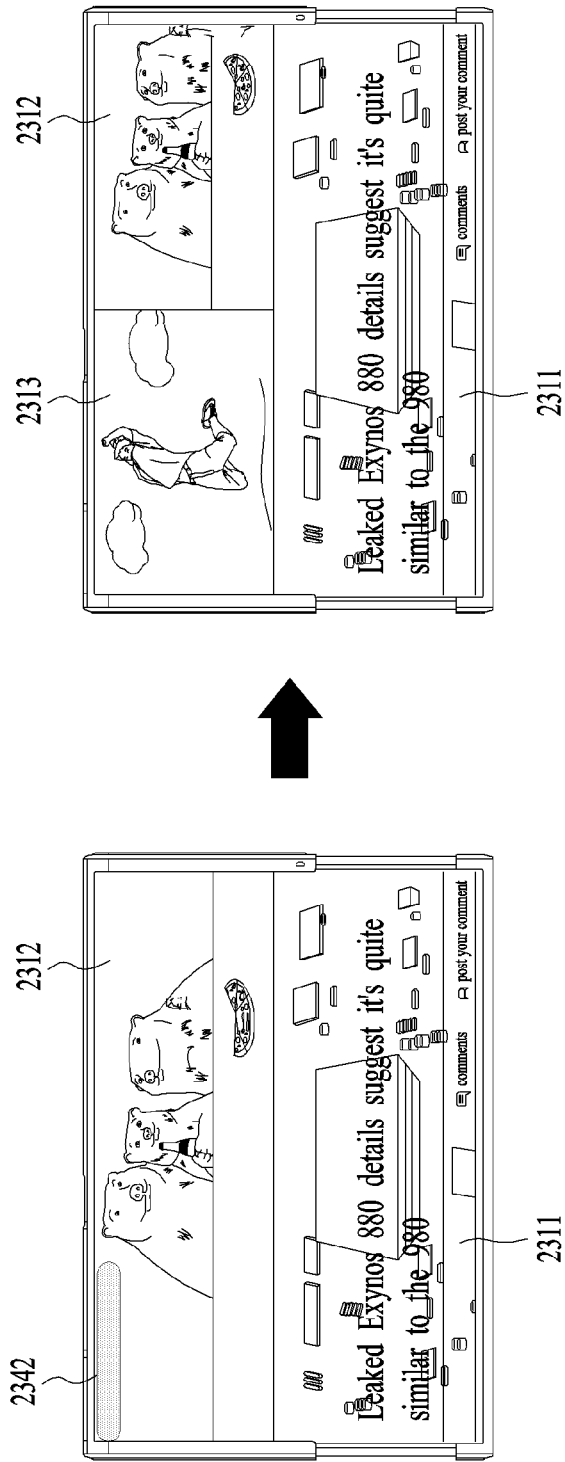

FIGS. 23A and 23B illustrate embodiments in which an already divided region of the display is divided once more, unlike in FIGS. 21A to 22B.

Referring to a first drawing of FIG. 23A, the mobile terminal may output a first application 2311 and a second application 2312 in vertically divided regions of the display. In this regard, the mobile terminal may output a first visual effect 2341 in an upper right region of the second application 2312. That is, the first visual effect 2341 may be output in a right edge area of the second application 2312 based on screen division histories of the first application 2311 and the second application 2312.

Referring to a second drawing of FIG. 23A, the mobile terminal may divide the display region in which the second application 2312 is output upon receiving a signal for selecting the first visual effect 2341. Accordingly, the mobile terminal may output the first application 2311 in a left region, divide a right region vertically, output a third application 2313 in an upper right region, and output the second application 2312 in a lower right region.

FIG. 23B illustrates an embodiment in which the region of the display divided into the two regions is divided into three regions to output three applications as in FIG. 23A, but the screen is divided horizontally. Redundant descriptions will be omitted below.

Figure 24:
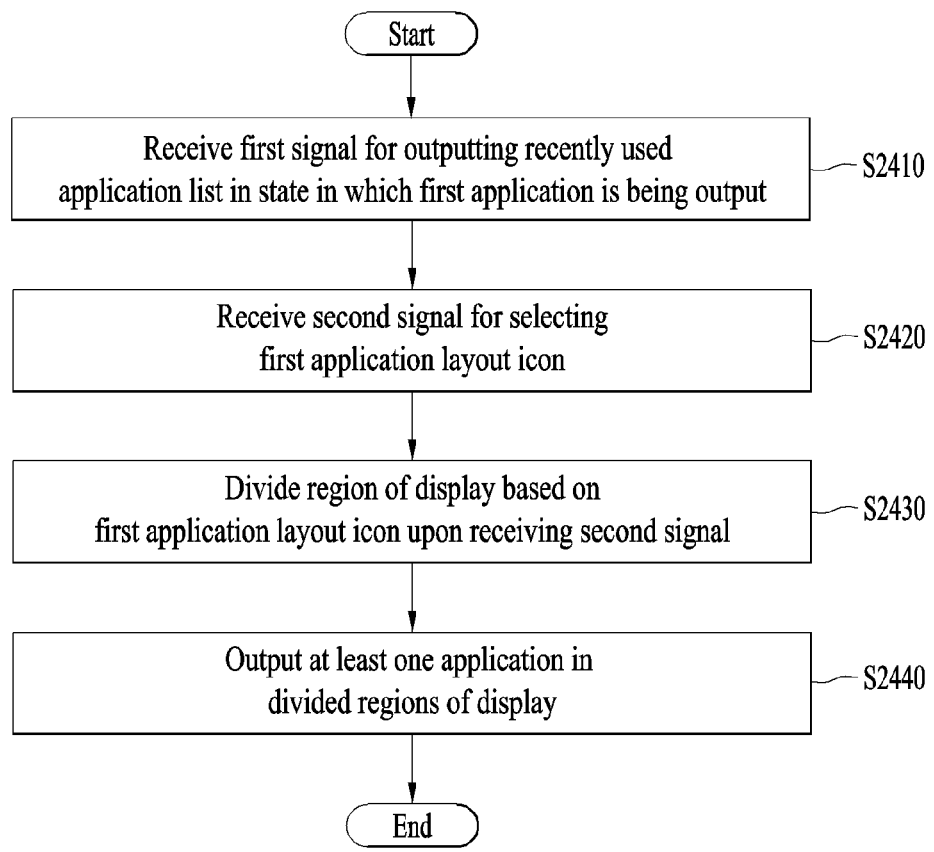
FIG. 24 is a flowchart illustrating an embodiment of outputting applications in divided regions of a screen based on an application layout icon in a mobile terminal according to an embodiment of the present disclosure.

FIG. 24 is a flowchart illustrating an embodiment of outputting applications in divided regions of a screen based on an application layout icon in a mobile terminal according to an embodiment of the present disclosure. Each step of FIG. 24 to be described below may be controlled by the controller in FIG. 1. In particular, the mobile terminal performing the control method in FIG. 24 includes the display coupled to the body such that the display region visible from the front surface of the body is variable as the display mode is switched between the enlarged display mode and the reduced display mode.

In step S2410, the mobile terminal may receive the first signal for outputting the recently used application list in the state in which the first application is being output. In this regard, the recently used application list may contain the at least one application layout icon.

In step S2420, the mobile terminal may receive the second signal for selecting the first application layout icon. In this regard, the mobile terminal may select the first application layout icon in the predetermined manner and change the first application icon to the second application icon.

In step S2430, the mobile terminal may divide the region of the display based on the first application layout icon upon receiving the second signal. For example, when the first application layout icon contains the first application icon corresponding to the first application, the second application icon corresponding to the second application, and the third application icon corresponding to the third application, the mobile terminal may divide the region of the display into three and output the applications based on the first application layout icon.

In step S2440, the mobile terminal may output the at least one application in the divided regions of the display.

The embodiments described above with reference to FIGS. 10 to 23B may be implemented with the method for controlling the mobile terminal as shown in FIG. 24.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

INDUSTRIAL APPLICABILITY

The mobile terminal according to one embodiment of the present disclosure is able to be repeatedly implemented and has industrial applicability.

What is claimed is:

1. A mobile terminal comprising:
a body;
an input device for receiving an input of a user;
a display coupled to the body such that a display region visible from a front surface of the body varies as a mode of the display is switched between an enlarged display mode and a reduced display mode; and
a controller,
wherein the controller is configured to:
receive a first signal for outputting a previously used application list containing a first application layout icon in a state where a first application is output on the display;
receive a second signal for selecting the first application layout icon;
divide the region of the display based on the first application layout icon upon receiving the second signal; and
output at least one application in the divided regions of the display,
wherein the previously used application list contains a second application layout icon representing a fifth application,
wherein the controller is further configured to:
change the second application layout icon to a third application layout icon representing both the fifth application and a sixth application in response to a third signal for selecting the second application layout icon;
divide the region of the display based on the changed third application layout icon in response to a fourth signal for selecting the third application layout icon; and
output the fifth application and the sixth application in the divided regions of the display based on the third application layout icon.

2. The mobile terminal of claim 1, wherein, based on the first application layout icon containing an icon corresponding to the first application, an icon corresponding to a second application, and an icon corresponding to a third application, the controller is configured to respectively output the first application, the second application, and the third application in the divided regions of the display based on the first application layout icon.

3. The mobile terminal of claim 1, wherein the controller is configured to:
output the previously used application list containing the third application layout icon in a state where the fifth application and the sixth application are output in the divided regions of the display based on the third application layout icon;
change the third application layout icon to the second application layout icon in response to a fifth signal for changing the third application layout icon; and
output the fifth application in a full screen on the display based on the changed second application layout icon in response to a sixth signal for selecting the second application layout icon.

4. The mobile terminal of claim 1, wherein the first application layout icon is created based on a screen division history of the first application.

5. The mobile terminal of claim 4, wherein the controller is configured to output a visual effect on the first application layout icon based on the screen division history of the first application.

6. The mobile terminal of claim 5, wherein the controller is configured to:
divide the region of the display based on a fourth application layout icon created based on the screen division history of the first application, based on a seventh signal for selecting the visual effect being no longer applied after going beyond a threshold value; and
output the fourth application layout icon as a preview based on the seventh signal not going beyond the threshold value.

7. The mobile terminal of claim 1, wherein the controller is configured to:
output the first application on a pop-up window in response to the first signal; and
output at least one application contained in the first application layout icon as a background screen of the pop-up window based on the first application layout icon.

8. The mobile terminal of claim 7, wherein the controller is configured to divide the region of the display based on the first application layout icon and output the at least one application in response to an eighth signal for selecting the pop-up window and then dragging the pop-up window in a first direction.

9. The mobile terminal of claim 1, wherein the controller is configured to:
output the first application as a background screen in response to the first signal; and
output a fourth application on a pop-up window based on a screen division history of the first application.

10. The mobile terminal of claim 9, wherein the controller is configured to output the fourth application on the display in a full screen in response to a ninth signal for selecting the fourth application output on the pop-up window.

11. The mobile terminal of claim 9, wherein the controller is configured to output the first application and the fourth application in the divided regions of the display in response to a tenth signal for selecting the fourth application output on the pop-up window and dragging the fourth application to the background screen.

12. The mobile terminal of claim 1, wherein the controller is configured to:
output a visual effect in a predetermined region of the first application based on the first application has a screen division history; and
divide the region of the display based on the screen division history to output the at least one application in response to an eleventh signal for selecting the visual effect.

13. The mobile terminal of claim 12, wherein the predetermined region is determined based on the screen division history.

14. The mobile terminal of claim 1, wherein the previously used application list contains a plurality of application layout icons, wherein the controller is configured to align the plurality of application layout icons based on attributes.

15. A method for controlling a mobile terminal including a display coupled to a body such that a display region visible from a front surface of the body varies as a mode of the display is switched between an enlarged display mode and a reduced display mode, the method comprising:
receiving a first signal for outputting a previously used application list in a state where the first application is output, wherein the previously used application list contains a first application layout icon;
receiving a second signal for selecting the first application layout icon;
dividing a region of the display based on the first application layout icon upon receiving the second signal; and
outputting at least one application in the divided regions of the display,
wherein the previously used application list contains a second application layout icon representing a fifth application, and
wherein the method further comprises:
changing the second application layout icon to a third application layout icon representing both the fifth application and a sixth application in response to a third signal for selecting the second application layout icon;
dividing the region of the display based on the changed third application layout icon in response to a fourth signal for selecting the third application layout icon; and
outputting the fifth application and the sixth application in the divided regions of the display based on the third application layout icon.

* * * * *